United States Patent
Lin et al.

(10) Patent No.: US 7,408,990 B2
(45) Date of Patent: Aug. 5, 2008

(54) EFFICIENT MOTION VECTOR CODING FOR VIDEO COMPRESSION

(75) Inventors: Chih-Lung (Bruce) Lin, Redmond, WA (US); Ming-Chieh Lee, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 472 days.

(21) Appl. No.: 10/882,489

(22) Filed: Jun. 30, 2004

(65) Prior Publication Data

US 2005/0036759 A1 Feb. 17, 2005

Related U.S. Application Data

(63) Continuation of application No. 09/201,278, filed on Nov. 30, 1998, now Pat. No. 6,983,018.

(51) Int. Cl.
*H04N 7/18* (2006.01)

(52) U.S. Cl. .............................. 375/240.16; 375/240.17; 375/240.23

(58) Field of Classification Search ........................ 375/ 240.01–240.29; 341/30–80
See application file for complete search history.

(56) References Cited

U.S. PATENT DOCUMENTS

| | | | |
|---|---|---|---|
| 4,454,546 A | 6/1984 | Mori | |
| 4,661,849 A | 4/1987 | Hinman | |
| 4,661,853 A | 4/1987 | Roeder et al. | |
| 4,691,329 A | 9/1987 | Juri et al. | |
| 4,695,882 A | 9/1987 | Wada et al. | |
| 4,796,087 A | 1/1989 | Guichard et al. | |
| 4,800,432 A | 1/1989 | Barnett et al. | |
| 4,849,812 A | 7/1989 | Borgers et al. | |
| 4,862,267 A | 8/1989 | Gillard et al. | |
| 4,864,393 A | 9/1989 | Harradine et al. | |
| 4,999,705 A | 3/1991 | Puri | |
| 5,021,879 A | 6/1991 | Vogel | |
| 5,068,724 A | 11/1991 | Krause et al. | |
| 5,089,887 A | 2/1992 | Robert et al. | |
| 5,091,782 A | 2/1992 | Krause et al. | |
| 5,103,306 A | 4/1992 | Weiman et al. | |

(Continued)

FOREIGN PATENT DOCUMENTS

EP 0 279 053 8/1988

(Continued)

OTHER PUBLICATIONS

Jeong et al., "Adaptive Huffman Coding of 2-D DCT Coefficients for Image Sequence Compression," *Signal Processing: Image Communication*, vol. 7, 11 pp. (1995).

(Continued)

*Primary Examiner*—Andy S Rao
(74) *Attorney, Agent, or Firm*—Klarquist Sparkman, LLP

(57) ABSTRACT

Video coding efficiency is improved by jointly coding the x and y components of motion vectors with a single variable length code. The motion vector components for a block of pixels are predicted based on motion vectors of neighboring blocks of pixels. The predicted x and y components are then jointly coded by assigning a single variable length code corresponding to the pair of components, rather than a separate code for each component. If the x and y components do not have a corresponding entry in the coding table, they are coded with an escape code followed by fixed length codes.

42 Claims, 4 Drawing Sheets

U.S. PATENT DOCUMENTS

| | | | |
|---|---|---|---|
| 5,117,287 A | 5/1992 | Koike et al. | |
| 5,155,594 A | 10/1992 | Bernstein et al. | |
| 5,157,490 A | 10/1992 | Kawai et al. | |
| 5,175,618 A | 12/1992 | Ueda | |
| 5,223,949 A | 6/1993 | Honjo | |
| 5,258,836 A | 11/1993 | Murata | |
| 5,274,453 A | 12/1993 | Maeda | |
| 5,298,991 A | 3/1994 | Yagasaki et al. | |
| 5,319,463 A | 6/1994 | Hongu et al. | |
| 5,376,971 A | 12/1994 | Kadono et al. | |
| 5,379,351 A | 1/1995 | Fandrianto et al. | |
| 5,400,075 A | 3/1995 | Savatier | |
| 5,412,430 A | 5/1995 | Nagata | |
| RE34,965 E | 6/1995 | Sugiyama | |
| 5,422,676 A | 6/1995 | Herpel et al. | |
| 5,424,779 A | 6/1995 | Odaka | |
| 5,428,396 A * | 6/1995 | Yagasaki et al. | 375/240.16 |
| 5,442,400 A | 8/1995 | Sun | |
| 5,448,297 A | 9/1995 | Alattar et al. | |
| 5,457,495 A | 10/1995 | Hartung | |
| 5,461,421 A | 10/1995 | Moon | |
| RE35,093 E | 11/1995 | Wang et al. | |
| 5,465,118 A | 11/1995 | Hancock et al. | |
| 5,467,086 A | 11/1995 | Jeong | |
| 5,467,136 A | 11/1995 | Odaka et al. | |
| 5,477,272 A | 12/1995 | Zhang et al. | |
| RE35,158 E | 2/1996 | Sugiyama | |
| 5,491,523 A | 2/1996 | Sato | |
| 5,510,840 A | 4/1996 | Yonemitsu et al. | |
| 5,517,327 A | 5/1996 | Nakatani et al. | |
| 5,539,466 A | 7/1996 | Igarashi et al. | |
| 5,544,286 A | 8/1996 | Laney | |
| 5,546,129 A | 8/1996 | Lee | |
| 5,550,541 A | 8/1996 | Todd | |
| 5,552,832 A | 9/1996 | Astle | |
| 5,565,922 A | 10/1996 | Krause | |
| 5,594,504 A | 1/1997 | Ebrahimi | |
| 5,598,215 A | 1/1997 | Watanabe | |
| 5,598,216 A | 1/1997 | Lee | |
| 5,617,144 A | 4/1997 | Lee | |
| 5,619,281 A | 4/1997 | Jung | |
| 5,623,311 A | 4/1997 | Phillips et al. | |
| 5,654,771 A | 8/1997 | Tekalp et al. | |
| 5,659,365 A | 8/1997 | Wilkinson | |
| 5,666,461 A | 9/1997 | Igarashi et al. | |
| 5,668,608 A | 9/1997 | Lee | |
| 5,668,932 A | 9/1997 | Laney | |
| 5,673,339 A | 9/1997 | Lee | |
| 5,689,306 A | 11/1997 | Jung | |
| 5,692,063 A | 11/1997 | Lee et al. | |
| 5,699,476 A | 12/1997 | Van Der Meer | |
| 5,701,164 A | 12/1997 | Kato | |
| 5,715,005 A * | 2/1998 | Masaki | 375/240.16 |
| 5,748,789 A | 5/1998 | Lee et al. | |
| 5,784,175 A | 7/1998 | Lee | |
| 5,786,860 A | 7/1998 | Kim et al. | |
| 5,787,203 A | 7/1998 | Lee et al. | |
| 5,793,897 A * | 8/1998 | Jo et al. | 382/246 |
| 5,796,855 A | 8/1998 | Lee | |
| 5,799,113 A | 8/1998 | Lee | |
| RE35,910 E | 9/1998 | Nagata et al. | |
| 5,825,830 A | 10/1998 | Kopf | |
| 5,825,929 A | 10/1998 | Chen et al. | |
| 5,835,144 A | 11/1998 | Matsumura et al. | |
| 5,835,149 A | 11/1998 | Astle | |
| 5,844,613 A | 12/1998 | Chaddha | |
| 5,847,776 A | 12/1998 | Khmelnitsky et al. | |
| 5,874,995 A | 2/1999 | Naimpally et al. | |
| 5,901,248 A | 5/1999 | Fandrianto et al. | |
| 5,929,940 A | 7/1999 | Jeannin | |
| 5,946,042 A | 8/1999 | Kato | |
| 5,946,043 A | 8/1999 | Lee et al. | |
| 5,949,489 A | 9/1999 | Nishikawa et al. | |
| 5,959,673 A | 9/1999 | Lee et al. | |
| 5,963,258 A | 10/1999 | Nishikawa et al. | |
| 5,963,259 A | 10/1999 | Nakaya et al. | |
| 5,963,673 A | 10/1999 | Kodama et al. | |
| 5,970,173 A | 10/1999 | Lee et al. | |
| 5,970,175 A | 10/1999 | Nishikawa et al. | |
| 5,973,743 A | 10/1999 | Han | |
| 5,973,755 A | 10/1999 | Gabriel | |
| 5,982,437 A | 11/1999 | Okazaki et al. | |
| 5,982,438 A | 11/1999 | Lin et al. | |
| 5,990,960 A | 11/1999 | Murakami et al. | |
| 5,991,447 A | 11/1999 | Eifrig et al. | |
| 6,002,439 A | 12/1999 | Murakami et al. | |
| 6,005,980 A | 12/1999 | Eifrig et al. | |
| RE36,507 E | 1/2000 | Iu | |
| 6,011,596 A | 1/2000 | Burl et al. | |
| 6,026,195 A | 2/2000 | Eifrig et al. | |
| 6,035,070 A | 3/2000 | Moon et al. | |
| 6,040,863 A | 3/2000 | Kato | |
| 6,052,150 A | 4/2000 | Kikuchi | |
| 6,058,212 A | 5/2000 | Yokoyama | |
| 6,067,322 A | 5/2000 | Wang | |
| 6,094,225 A | 7/2000 | Han | |
| RE36,822 E | 8/2000 | Sugiyama | |
| 6,097,759 A | 8/2000 | Murakami et al. | |
| 6,111,914 A | 8/2000 | Bist | |
| 6,130,963 A | 10/2000 | Uz et al. | |
| 6,148,027 A * | 11/2000 | Song et al. | 375/240 |
| 6,148,033 A | 11/2000 | Pearlstein et al. | |
| 6,154,495 A | 11/2000 | Yamaguchi et al. | |
| 6,188,725 B1 | 2/2001 | Sugiyama | |
| 6,188,794 B1 | 2/2001 | Nishikawa et al. | |
| 6,201,927 B1 | 3/2001 | Comer | |
| 6,205,176 B1 | 3/2001 | Sugiyama | |
| 6,208,761 B1 | 3/2001 | Passagio et al. | |
| 6,215,905 B1 | 4/2001 | Lee et al. | |
| 6,219,070 B1 | 4/2001 | Baker et al. | |
| 6,219,464 B1 | 4/2001 | Greggain et al. | |
| 6,233,017 B1 | 5/2001 | Chaddha | |
| RE37,222 E | 6/2001 | Yonemitsu | |
| 6,243,418 B1 | 6/2001 | Kim | |
| 6,263,024 B1 | 7/2001 | Matsumoto | |
| 6,271,885 B2 | 8/2001 | Sugiyama | |
| 6,275,531 B1 | 8/2001 | Li | |
| 6,281,942 B1 | 8/2001 | Wang | |
| 6,282,243 B1 | 8/2001 | Kazui et al. | |
| 6,289,049 B1 * | 9/2001 | Kim et al. | 375/240.16 |
| 6,292,585 B1 | 9/2001 | Yamaguchi et al. | |
| 6,295,376 B1 | 9/2001 | Nakaya | |
| 6,307,887 B1 | 10/2001 | Gabriel | |
| 6,307,973 B2 | 10/2001 | Nishikawa et al. | |
| 6,320,593 B1 | 11/2001 | Sachs et al. | |
| 6,324,216 B1 | 11/2001 | Igarashi | |
| 6,337,881 B1 | 1/2002 | Chaddha | |
| 6,339,656 B1 | 1/2002 | Marui | |
| 6,377,628 B1 | 4/2002 | Schultz et al. | |
| 6,381,279 B1 | 4/2002 | Taubman | |
| 6,396,876 B1 | 5/2002 | Babonneau et al. | |
| 6,404,813 B1 | 6/2002 | Haskell et al. | |
| 6,418,166 B1 | 7/2002 | Wu et al. | |
| 6,430,316 B1 | 8/2002 | Wilkinson | |
| 6,441,842 B1 | 8/2002 | Fandrianto et al. | |
| 6,496,608 B1 | 12/2002 | Chui | |
| 6,529,632 B1 | 3/2003 | Nakaya et al. | |
| 6,539,056 B1 | 3/2003 | Sato et al. | |
| 6,563,953 B2 | 5/2003 | Lin et al. | |
| 6,647,061 B1 | 11/2003 | Panusopone et al. | |
| 6,650,781 B2 | 11/2003 | Nakaya | |
| 6,728,317 B1 | 4/2004 | Demos | |
| 6,950,469 B2 | 9/2005 | Karczewicz et al. | |
| 6,968,008 B1 | 11/2005 | Ribas-Corbera et al. | |

| | | | |
|---|---|---|---|
| 6,983,018 | B1 | 1/2006 | Lin et al. |
| 7,023,919 | B2 * | 4/2006 | Cho et al. ............. 375/240.16 |
| 2002/0186890 | A1 | 12/2002 | Lee et al. |
| 2003/0099292 | A1 | 5/2003 | Wang et al. |
| 2003/0112864 | A1 | 6/2003 | Karczewicz et al. |
| 2003/0113026 | A1 | 6/2003 | Srinivasan et al. |
| 2003/0142748 | A1 | 7/2003 | Tourapis |
| 2003/0152146 | A1 | 8/2003 | Lin et al. |
| 2003/0156646 | A1 | 8/2003 | Hsu et al. |
| 2003/0202705 | A1 | 10/2003 | Sun |
| 2005/0013497 | A1 | 1/2005 | Hsu et al. |
| 2005/0013498 | A1 | 1/2005 | Srinivasan |
| 2005/0036759 | A1 | 2/2005 | Lin et al. |
| 2005/0100093 | A1 | 5/2005 | Holcomb |
| 2005/0226335 | A1 | 10/2005 | Lee et al. |
| 2006/0013307 | A1 | 1/2006 | Olivier et al. |

FOREIGN PATENT DOCUMENTS

| | | |
|---|---|---|
| EP | 0 397 402 | 11/1990 |
| EP | 0 526 163 | 2/1993 |
| EP | 0 535 746 | 4/1993 |
| EP | 0535746 A2 | 4/1993 |
| EP | 0540350 A2 | 5/1993 |
| EP | 0 588 653 | 3/1994 |
| EP | 0614318 A2 | 9/1994 |
| EP | 0614318 A3 | 9/1994 |
| EP | 0625853 A2 | 11/1994 |
| EP | 0625853 A3 | 11/1994 |
| EP | 0 651 574 | 5/1995 |
| EP | 0 771 114 | 5/1997 |
| EP | 0 786 907 | 7/1997 |
| EP | 0825778 A2 | 2/1998 |
| EP | 0830029 A2 | 3/1998 |
| EP | 0 863 675 | 9/1998 |
| EP | 0 884 912 | 12/1998 |
| EP | 0 944 245 | 9/1999 |
| GB | 2328337 | 2/1999 |
| GB | 2343579 | 5/2000 |
| JP | 61205086 | 9/1986 |
| JP | 62 213 494 | 9/1987 |
| JP | 3001688 | 1/1991 |
| JP | 3 129 986 | 3/1991 |
| JP | 6 078 295 | 3/1994 |
| JP | 6 078 298 | 3/1994 |
| JP | 06-276481 | 9/1994 |
| JP | 06-276511 | 9/1994 |
| JP | 7-274171 | 10/1995 |
| JP | 08-140099 | 5/1996 |
| JP | 09-322163 | 12/1997 |
| JP | 10 056 644 | 2/1998 |
| JP | 6292188 | 10/2004 |
| WO | WO 00/33581 | 8/2000 |
| WO | WO 01/95633 | 12/2001 |
| WO | WO 03/026296 | 3/2003 |

OTHER PUBLICATIONS

Bist et al., "Adaptive Quantization for Low Bit Rate Video Coding," *Proc. 1998 Int'l Conf. on Image Processing (ICIP 98)*, pp. 925-928, Los Alamitos, CA (1998).
ISO/IEC, "ISO/IEC 11172-2, Information technology—Coding of moving pictures and associated audio for digital storage media at up to about 1,5 Mbit/s—Part 2: Video," 112 pp. (1993).
ITU-T, "ITU-T Recommendation H.261, Video Codec for Audiovisual Services at p × 64 kbits," 25 pp. (1993).
ITU-T, "ITU-T Recommendation H.262, Information Technology—Generic Coding of Moving Pictures and Associated Audio Information: Video," 205 pp. (1995).
Reader, "History of MPEG Video Compression—Ver. 4.0," 99 pp., document marked Dec. 16, 2003.
Yu et al., "Two-Dimensional Motion Vector Coding for Low Bitrate Videophone Applications," Proc. Int'l Conf. on Image Processing, Los Alamitos, US, pp. 414-417, IEEE Comp. Soc. Press (1995).
Fogg, "Survey of Software and Hardware VLC Architectures," SPIE vol. 2186, pp. 29-37 (no date of publication).
Gersho et al., *Vector Quantization and Signal Compression*, "Entropy Coding," Chapter 9, pp. 259-305 (1992).
Gibson et al., *Digital Compression of Multimedia*, "Lossless Source Coding," Chapter 2, pp. 17-62 (1998).
Gibson et al., *Digital Compression of Multimedia*, "Universal Lossless Source Coding," Chapter 3, pp. 63-112 (1998).
Gibson et al., *Digital Compression of Multimedia*, "Multimedia Conferencing Standards," Chapter 10, pp. 309-362 (1998).
Gibson et al., *Digital Compression of Multimedia*, "MPEG Compression," Chapter 11, pp. 363-418 (1998).
IBM Technical Disclosure Bulletin, "Advanced Motion Estimation for Moving Picture Expert Group Encoders," vol. 39, No. 04, pp. 323-324 (Apr. 1996).
ISO/IEC FCD 14496:2 Information Technology—Very low bitrate audio-visual coding—Part 2: visual [SC29/WG 11, N 2202], ISO/IEC JTC 1/SC 29/WG 11, May 28, 1998.
International Organization for Standardisation ISO/IEC JTCI/SC29/WG11, N2459 "Overview of the MPEG-4 Standards," (Oct. 1998).
ISO, ISO/IEC JTC1/SC29/WG11 MPEG 97/N1642, "MPEG-4 Video Verification Model Version 7.0, 3. Encoder Definition," pp. 1, 17-122, Bristol (Apr. 1997).
ITU-T, "ITU-T Recommendation H.263 Video Coding for Low Bit Rate Communication," (Feb. 1998).
Kunt, Second-Generation Image-Coding Techniques, Proceedings of IEEE, vol. 73, No. 4, pp. 549-574 (Apr. 1995).
Le Gall, "MPEG: A Video Compression Standard for Multimedia Applications," Communications of the ACM, vol. 34, No. 4, pp. 47-58 (Apr. 1991).
Lee et al., "A Layered Video Object Coding System Using Sprite and Affine Motion Model, IEEE Transactions on Circuits and Systems for Video Technology," vol. 7, No. 1, pp. 130-145 (Feb. 1997).
Pennebaker et al., "JPEG Still Image Data Compression Standard," Chapter 20, pp. 325-329, 1993 (no publication date).
"Video Coding for Low Bitrate Communication," Draft Recommendation H.263, International Telecommunications Union, 51 pages (Dec. 1995).
Bartkowiak et al., "Color Video Compression Based on Chrominance Vector Quantization," *7th Int'l Workshop on Systems, Signals and Image Processing, IWSSIP 2000*, Maribor 7-9 VI, pp. 107-110 (2000).
Benzler et al., "Improving multiresolution motion compensating hybrid coding by drift reduction," *Picture Coding Symposium*, 4 pp. (1996).
Benzler et al., "Motion and aliasing compensating prediction with quarter-pel accuracy and adaptive overlapping blocks as proposal for MPEG-4 tool evaluation—Technical description," ISO/IEC JTC1/SC29/WG11, MPEG 95/0552, 5 pp. (document marked 1995).
Benzler, "Results of core experiments P8 (Motion and Aliasing Compensating Prediction)," ISO/IEC JTC1/SC29/WG11, MPEG 97/2625, 8 pp. (document marked 1997).
Borman et al., "Block-matching Sub-pixel Motion Estimation from Noisy, Under-Sampled Frames—an Empirical Performance Evaluation," *SPIE Visual Comm. & Image Processing*, 10 pp. (1999).
Conklin et al., "Multi-resolution Motion Estimation," *Proc. ICASSP '97*, Munich, Germany, 4 pp. (1997).
Davis et al., "Equivalence of subpixel motion estimators based on optical flow and block matching," *Proc. IEEE Int'l Symposium on Computer Vision*, pp. 7-12 (1995).
de Haan et al., "Sub-pixel motion estimation with 3-D recursive search block-matching," *Signal Processing: Image Comm.6*, pp. 229-239 (1994).
"DivX Multi Standard Video Encoder," 2 pp. (Downloaded from the World Wide Web on Jan. 24, 2006).
Ericsson, "Fixed and Adaptive Predictors for Hybrid Predictive/Transform Coding," IEEE Transactions on Comm., vol. COM-33, No. 12, pp. 1291-1302 (1985).
Flierl et al., "Multihypothesis Motion Estimation for Video Coding," *Proc. DCC*, 10 pp. (Mar. 2001).
Girod, "Efficiency Analysis of Multihypothesis Motion-Compensated Prediction for Video Coding," *IEEE Transactions on Image Processing*, vol. 9, No. 2, pp. 173-183 (Feb. 2000).

Girod, "Motion Compensation: Visual Aspects, Accuracy, and Fundamental Limits," *Motion Analysis and Image Sequence Processing*, Kluwer Academic Publishers, pp. 125-152 (1993).

Girod, "Motion-Compensating Prediction with Fractional-Pel Accuracy," *IEEE Transactions on Comm.*, vol. 41, No. 4, pp. 604-612 (1993).

Horn et al., "Estimation of Motion Vector Fields for Multiscale Motion Compensation," *Proc. Picture Coding Symp. (PCS 97)*, pp. 141-144 (Sep. 1997).

Hsu et al., "A Low Bit-Rate Video Codec Based on Two-Dimensional Mesh Motion Compensation with Adaptive Interpolation," *IEEE Transactions on Circuits and Systems for Video Technology*, vol. II, No. 1, pp. 111-117 (Jan. 2001).

ITU—Q15-F-24, "MVC Video Codec—Proposal for H.26L," Study Group 16, Video Coding Experts Group (Question 15), 28 pp. (document marked as generated in 1998).

Iwahashi et al., "A Motion Compensation Technique for Downscaled Pictures in Layered Coding," *IEICE Transactions on Comm.*, vol. E77-B, No. 8, pp. 1007-1012 (Aug. 1994).

Keys, "Cubic Convolution Interpolation for Digital Image Processing," *IEEE Transactions on Acoustics, Speech & Signal Processing*, vol. ASSP-29, No. 6, pp. 1153-1160 (1981).

Konrad et al., "On Motion Modeling and Estimation for Very Low Bit Rate Video Coding," *Visual Comm. & Image Processing (VCIP '95)*, 12 pp. (May 1995).

Kossentini et al., "Predictive RD Optimized Motion Estimation for Very Low Bit-rate Video Coding," IEEE J. on Selected Areas in Communications, vol. 15, No. 9, pp. 1752-1763 (Dec. 1997).

Lopes et al., "Analysis of Spatial Transform Motion Estimation with Overlapped Compensation and Fractional-pixel Accuracy," *IEEE Proc. Visual Image Signal Processing*, vol. 146, No. 6, pp. 339-344 (Dec. 1999).

Morimoto et al., "Fast Electronic Digital Image Stabilization," *Proc. ICPR*, Vienna, Austria, 5 pp. (1996).

"Overview of MPEG-2 Test Model 5," 5 pp. [Downloaded from the World Wide Web on Mar. 1, 2006].

Printouts of FTP directories from http://ftp3.itu.ch, 8 pp. (downloaded from the World Wide Web on Sep. 20, 2005).

Ribas-Corbera et al., "On the Optimal Block Size for Block-based Motion-Compensated Video Coders," *SPIE Proc. of Visual Comm. & Image Processing*, vol. 3024, 12 pp. (1997).

Ribas-Corbera et al., "On the Optimal Motion Vector Accuracy for Block-based Motion-Compensated Video Coders," *Proc. SPIE Digital Video Compression*, San Jose, CA, 13 pp. (1996).

Schultz et al., "Subpixel Motion Estimation for Super-Resolution Image Sequence Enhancement," *Journal of Visual Comm. & Image Representation*, vol. 9, No. 1, pp. 38-50 (Mar. 1998).

"The TML Project Web-Page and Archive," (including pages of code marked "image.cpp for H.26L decoder, Copyright 1999" and "image.c"), 24 pp. [Downloaded from the World Wide Web on Jun. 1, 2005].

Triggs, "Empirical Filter Estimation for Subpixel Interpolation and Matching," *Int'l Conf. Computer Vision '01*, Vancouver, Canada, 8 pp. (Jul. 2001).

Triggs, "Optimal Filters for Subpixel Interpolation and Matching," *Int'l Conf. Computer Vision '01*, Vancouver, Canada, 10 pp. (Jul. 2001).

"Video Coding Using Wavelet Decomposition for Very Low Bit-Rate Networks," 16 pp. (1997).

Weiss et al., "Real Time Implementation of Subpixel Motion Estimation for Broadcast Applications," pp. 7/1-7/3 (1990).

Wiegand et al., "Long-term Memory Motion Compensated Prediction," *IEEE Transactions on Circuits & Systems for Video Technology*, vol. 9, No. 1, pp. 70-84 (Feb. 1999).

Wien, "Variable Block-Size Transforms for Hybrid Video Coding," Dissertation, 182 pp. (Feb. 2004).

Wu et al., "Joint estimation of forward and backward motion vectors for interpolative prediction of video," *IEEE Transactions on Image Processing*, vol. 3, No. 5, pp. 684-687 (Sep. 1994).

Yang et al., "Very High Efficiency VLSI Chip-pair for Full Search Block Matching with Fractional Precision," *Proc. ICASSP/IEEE Int'l Conf. on Acoustics, Speech & Signal Processing*, Glasgow, pp. 2437-2440 (May 1989).

* cited by examiner

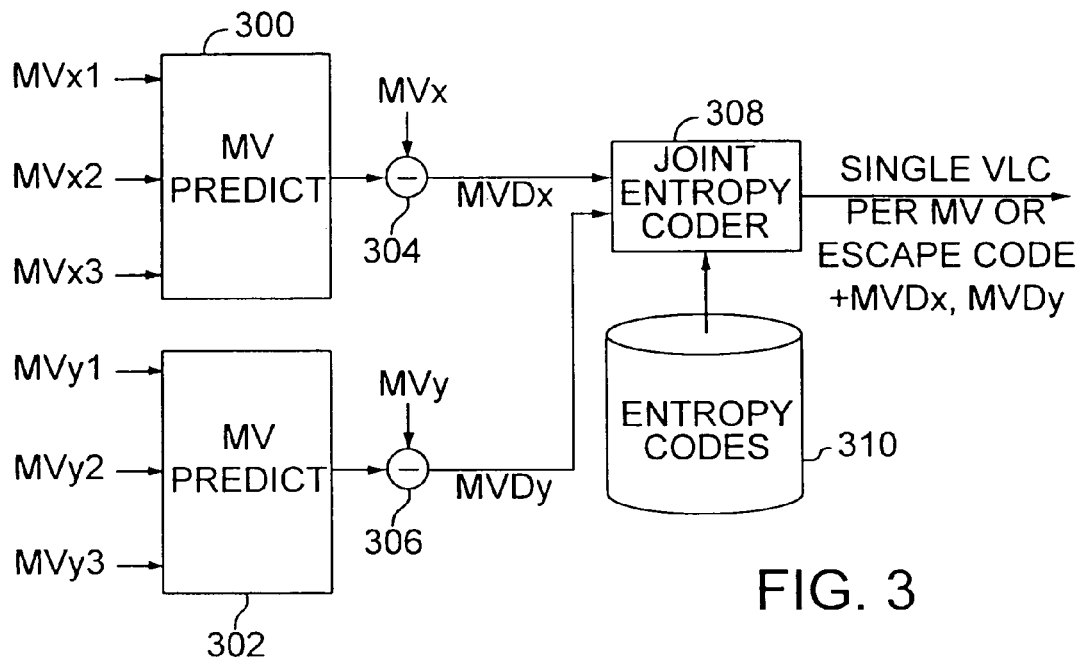
FIG. 3
FIG. 4
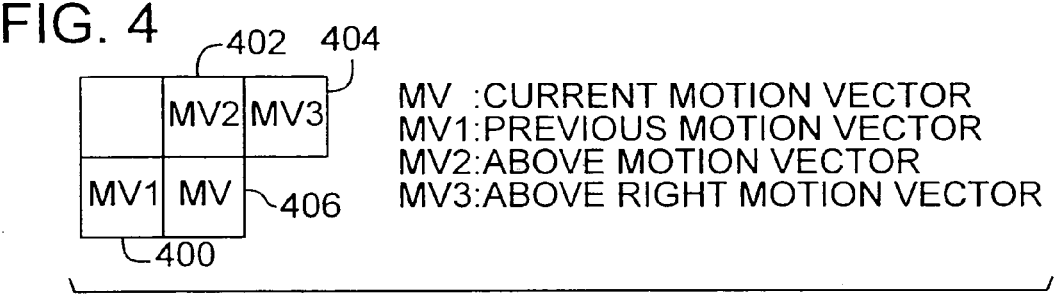
MV : CURRENT MOTION VECTOR
MV1: PREVIOUS MOTION VECTOR
MV2: ABOVE MOTION VECTOR
MV3: ABOVE RIGHT MOTION VECTOR
FIG. 5
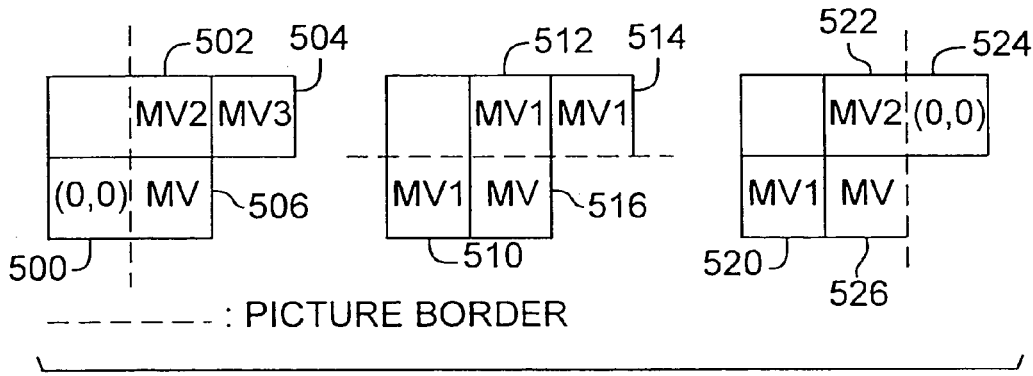
- - - - - : PICTURE BORDER

EFFICIENT MOTION VECTOR CODING FOR VIDEO COMPRESSION

CROSS REFERENCE TO RELATED APPLICATION

This is a continuation of U.S. patent application Ser. No. 09/201,278, filed Nov. 30, 1998, now U.S. Pat. No. 6,383,018, the disclosure of which is hereby incorporated by reference.

FIELD OF THE INVENTION

The invention relates to video coding, and specifically, to an improved method for coding motion vectors.

BACKGROUND OF THE INVENTION

Full-motion video displays based upon analog video signals have long been available in the form of television. With recent advances in computer processing capabilities and affordability, full-motion video displays based upon digital video signals are becoming more widely available. Digital video systems can provide significant improvements over conventional analog video systems in creating, modifying, transmitting, storing, and playing full-motion video sequences.

Digital video displays include large numbers of image frames that are played or rendered successively at frequencies of between 30 and 75 Hz. Each image frame is a still image formed from an array of pixels based on the display resolution of a particular system. As examples, VHS-based systems have display resolutions of 320×480 pixels, NTSC-based systems have display resolutions of 720×486 pixels, and high-definition television (HDTV) systems under development have display resolutions of 1360×1024 pixels.

The amounts of raw digital information included in video sequences are massive. Storage and transmission of these amounts of video information is infeasible with conventional personal computer equipment. Consider, for example, a digitized form of a relatively low resolution VHS image format having a 320×480 pixel resolution. A full-length motion picture of two hours in duration at this resolution corresponds to 100 gigabytes of digital video information. By comparison, conventional compact optical disks have capacities of about 0.6 gigabytes, magnetic hard disks have capacities of 1-2 gigabytes, and compact optical disks under development have capacities of up to 8 gigabytes.

To address the limitations in storing or transmitting such massive amounts of digital video information, various video compression standards or processes have been established, including MPEG-1, MPEG-2, and H.26X. These video compression techniques utilize similarities between successive image frames, referred to as temporal or interframe correlation, to provide interframe compression in which motion data and error signals are used to encode changes between frames.

In addition, the conventional video compression techniques utilize similarities within image frames, referred to as spatial or intraframe correlation, to provide intraframe compression in which the image samples within an image frame are compressed. Intraframe compression is based upon conventional processes for compressing still images, such as discrete cosine transform (DCT) encoding. This type of coding is sometimes referred to as "texture" or "transform" coding. A "texture" generally refers to a two-dimensional array of image sample values, such as an array of chrominance and luminance values or an array of alpha (opacity) values. The term "transform" in this context refers to how the image samples are transformed into spatial frequency components during the coding process. This use of the term "transform" should be distinguished from a geometric transform used to estimate scene changes in some interframe compression methods.

Interframe compression typically utilizes motion estimation and compensation to encode scene changes between frames. Motion estimation is a process for estimating the motion of image samples (e.g., pixels) between frames. Using motion estimation, the encoder attempts to match blocks of pixels in one frame with corresponding pixels in another frame. After the most similar block is found in a given search area, the change in position of the pixel locations of the corresponding pixels is approximated and represented as motion data, such as a motion vector. Motion compensation is a process for determining a predicted image and computing the error between the predicted image and the original image. Using motion compensation, the encoder applies the motion data to an image and computes a predicted image. The difference between the predicted image and the input image is called the error signal. Since the error signal is just an array of values representing the difference between image sample values, it can be compressed using the same texture coding method as used for intraframe coding of image samples.

Although differing in specific implementations, the MPEG-1, MPEG-2, and H.26X video compression standards are similar in a number of respects. The following description of the MPEG-2 video compression standard is generally applicable to the others.

MPEG-2 provides interframe compression and intraframe compression based upon square blocks or arrays of pixels in video images. A video image is divided into image sample blocks called macroblocks having dimensions of 16×16 pixels. In MPEG-2, a macroblock comprises four luminance blocks (each block is 8×8 samples of luminance (Y)) and two chrominance blocks (one 8×8 sample block each for Cb and Cr).

In MPEG-2, interframe coding is performed on macroblocks. An MPEG-2 encoder performs motion estimation and compensation to compute motion vectors and block error signals. For each block $M_N$ in an image frame N, a search is performed across the image of a next successive video frame N+1 or immediately preceding image frame N−1 (i.e., bi-directionally) to identify the most similar respective blocks $M_{N+1}$ or $M_{N-1}$. The location of the most similar block relative to the block $M_N$ is encoded with a motion vector (DX,DY). The motion vector is then used to compute a block of predicted sample values. These predicted sample values are compared with block $M_N$ to determine the block error signal. The error signal is compressed using a texture coding method such as discrete cosine transform (DCT) encoding.

Object-based video coding techniques have been proposed as an improvement to the conventional frame-based coding standards. In object-based coding, arbitrary shaped image features are separated from the frames in the video sequence using a method called "segmentation." The video objects or "segments" are coded independently. Object-based coding can improve the compression rate because it increases the interframe correlation between video objects in successive frames. It is also advantageous for variety of applications that require access to and tracking of objects in a video sequence.

In the object-based video coding methods proposed for the MPEG-4 standard, the shape, motion and texture of video objects are coded independently. The shape of an object is represented by a binary or alpha mask that defines the boundary of the arbitrary shaped object in a video frame. The motion of an object is similar to the motion data of MPEG-2, except that it applies to an arbitrary-shaped image of the object that has been segmented from a rectangular frame. Motion estimation and compensation is performed on blocks of a "video object plane" rather than the entire frame. The video object plane is the name for the shaped image of an object in a single frame.

The texture of a video object is the image sample information in a video object plane that falls within the object's shape. Texture coding of an object's image samples and error signals is performed using similar texture coding methods as in frame-based coding. For example, a segmented image can be fitted into a bounding rectangle formed of macroblocks. The rectangular image formed by the bounding rectangle can be compressed just like a rectangular frame, except that transparent macroblocks need not be coded. Partially transparent blocks are coded after filling in the portions of the block that fall outside the object's shape boundary with sample values in a technique called "padding."

In both frame-based and object-based video coding, the encoded bit stream typically includes many interframe-coded frames (P frames). Each of these P frames includes at least one motion vector per macroblock, and each motion vector includes X and Y components that coded independently. As such, motion vectors contribute a significant amount of data for each coded P frame. There is a need, therefore, for more efficient motion vector coding schemes.

SUMMARY OF THE INVENTION

The invention provides an improved method of coding motion vectors for video coding applications. One aspect of the invention is a method for jointly coding a motion vector with a single entropy code. This method is based on the discovery that the probability of the X and Y components of the motion vector are not totally independent. To exploit the correlation between the motion vector components, the method uses entropy coding to assign a single variable length code to a joint parameter representing the combined X and Y components of the motion vector. Motion vector component pairs that are more likely are assigned a shorter length code, while less likely component pairs are assigned a longer length code or are coded with an escape code followed by a code for each component. This approach can be used in a variety of video coding applications, including both object-based and frame based coding. In addition, joint entropy coding of motion vectors can be used in combination with spatial prediction to code motion vectors more efficiently.

For example, in one implementation, an encoder first computes a predictor for the motion vector, and then computes differential X and Y components from the X and Y components of the vector currently being processed and its predictor. A joint entropy coder then computes a single variable length code for a joint parameter representing both the X and Y differential components.

The decoder performs the inverse of the encoder operations to reconstruct the motion vector from the variable length code. In particular, it computes the joint parameter from the variable length code, and then reconstructs the motion vector from the differential components and the components of the predictor.

Additional features of the invention will become more apparent from the following detailed description and accompanying drawings.

BRIEF DESCRIPTION OF THE DRAWINGS

FIG. 3 is a block diagram illustrating how an implementation of the invention jointly codes motion vector components for a macroblock with a single entropy code.
FIG. 4 is a diagram illustrating how a predictor for the motion vector of a current block is selected from motion vectors of neighboring macroblocks.
FIG. 5 is a diagram illustrating how a motion vector predictor is selected in cases where one or more neighboring macroblocks are outside the picture.

DETAILED DESCRIPTION

Introduction

The first section below provides a description of a video encoder and decoder. Subsequent sections describe how to improve coding of motion vectors by exploiting the correlation between the X and Y components of the vectors.

This approach for jointly coding the X and Y components of a motion vector applies to both frame-based and object-based video coding. Both forms of video coding employ motion vectors to define the motion of a pixel or block of pixels from one frame to another. Typically, a motion vector is computed for regular sized blocks of pixels. In frame-based coding, the frame is divided into regular sized blocks. In object-based coding, each video object plane is divided into blocks. Since the object represented in a video object plane usually has a non-rectangular shape, object-based coders use the shape to determine which pixels in each block fall within the boundaries of the object. While frame-based and object-based coding differ in this respect, both approaches use motion vectors that define the motion of pixels in a block. Thus, the correlation between the X and Y components of motion vectors in both types of coders can be exploited to improve coding efficiency.

While the encoder and decoder described in the next section are object-based, they provide a sufficient basis for explaining how to implement the invention in both frame-based and object-based coding schemes.

Description of an Example Encoder and Decoder

Figure 1:
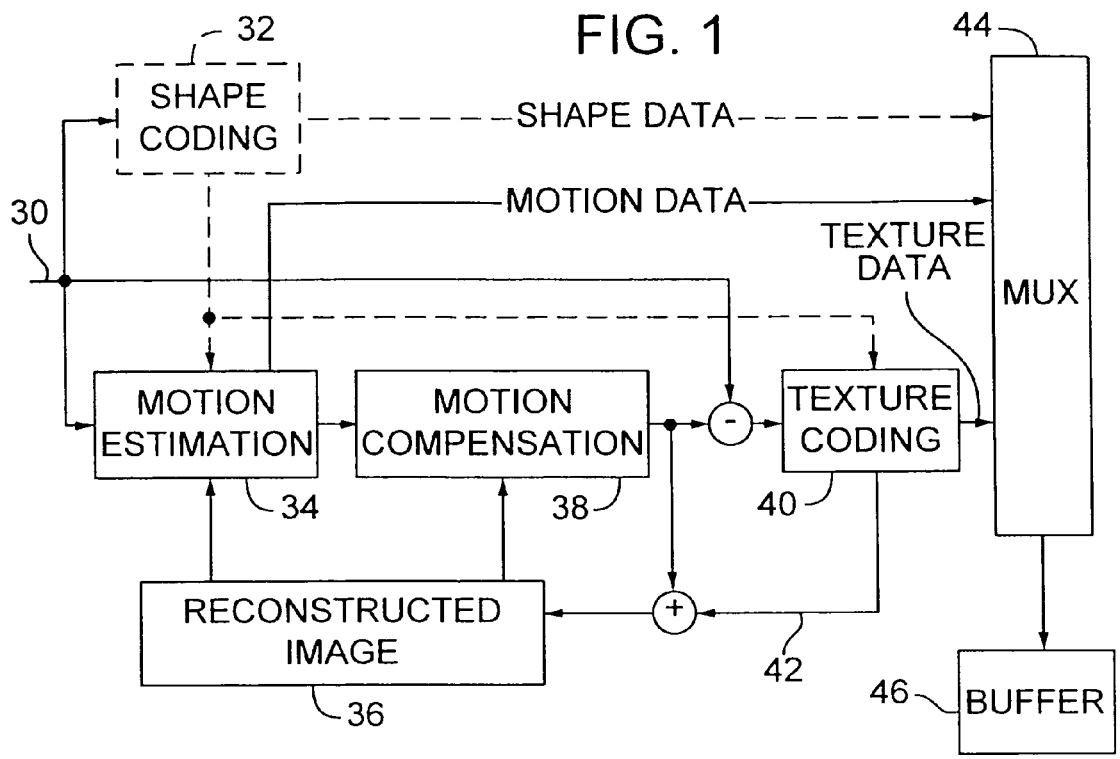
FIG. 1 is a block diagram of a video coder.

FIG. 1 is a block diagram illustrating an implementation of an object-based video encoder. The input 30 to the encoder includes images representing the video objects in each frame, the shape of each video object and bounding rectangles. The shape information is available before the encoder codes texture or motion data. Frame-based coding differs in that the entire frame is coded without shape information, and tile input 30 consists of a series of image frames.

The shape coding module 32 reads the definition of an object including its bounding rectangle and extends the bounding rectangle to integer multiples of macroblocks. The shape information for an object comprises a mask or "alpha plane." The shape coding module 32 reads this mask and compresses it, using for example, a conventional chain coding method to encode the contour of the object.

Motion estimation module 34 reads an object including its bounding rectangle and a previously reconstructed image 36 and computes motion estimation data used to predict the motion of an object from one frame to another. The motion estimation module 34 searches for the most similar macroblock in the reconstructed image for each macroblock in the current image to compute a motion vector for each macroblock. The specific format of the motion vector from the motion estimation module 34 can vary depending on the motion estimation method used. In the implementation described below, there is a motion vector for each macroblock, which is consistent with current MPEG and H26X formats.

The motion compensation module 38 reads the motion vectors computed by the motion estimation module and the previously reconstructed image 36 and computes a predicted image for the current frame. Each pixel in the predicted image is constructed by using the motion vector for the macroblock that it resides in to find the corresponding pixel in the previously reconstructed image 36. The encoder then finds the difference between the image sample values in the input image block as specified in the input 30 and the corresponding sample values in the predicted image block as computed in the motion compensation module 38 to determine the error signal for the macroblock.

Texture coding module 40 compresses this error signal for inter-frame coded objects and compresses image sample values for the object from the input data stream 30 for intra-frame coded objects. The feedback path 42 from the texture coding module 40 represents the error signal. The encoder uses the error signal blocks along with the predicted image blocks from the motion compensation module to compute the previously reconstructed image 36.

The texture coding module 40 codes intra-frame and error signal data for an object using any of a variety of still image compression techniques. Example compression techniques include DCT, wavelet, as well as other conventional image compression methods.

The bit stream of the compressed video sequence includes the shape, motion and texture coded information from the shape coding, motion estimation, and texture coding modules. Multiplexer 44 combines and formats this data into the proper syntax and outputs it to the buffer 46. As explained in more detail below, the encoder also includes a motion vector encoder that uses entropy coding to jointly code the x and y components of the motion vector for each macroblock. The motion vector encoder may be implemented as part of the motion estimation module 34 or as part of the data formatting functions in the multiplexer 44.

While the encoder can be implemented in hardware or software, it is most likely implemented in software. In a software implementation, the modules in the encoder represent software instructions stored in memory of a computer and executed in the processor, and the video data stored in memory. A software encoder can be stored and distributed on a variety of conventional computer readable media. In hardware implementations, the encoder modules are implemented in digital logic, preferably in an integrated circuit. Some of the encoder functions can be optimized in special-purpose digital logic devices in a computer peripheral to off-load the processing burden from a host computer.

Figure 2:
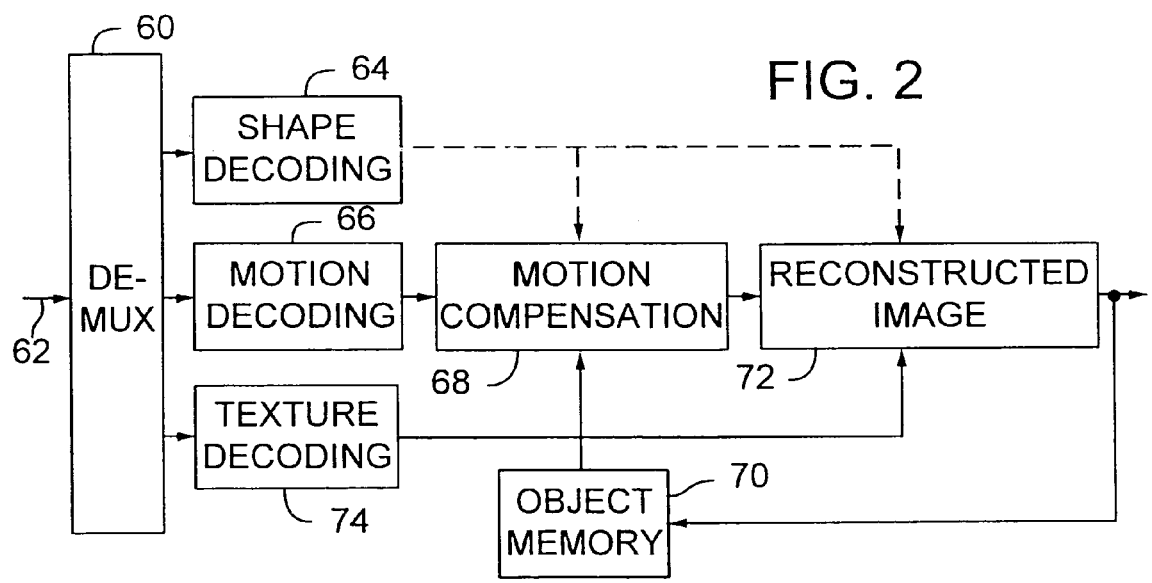
FIG. 2 is a block diagram of a video decoder.

FIG. 2 is a block diagram illustrating a decoder for an object-based video coding method. A demultiplexer 60 receives a bit stream representing a compressed video sequence and separates shapes, motion and texture encoded data on an object by object basis. The demultiplexer also includes a motion vector decoder that reconstructs the motion vector for each macroblock from a single variable length code.

Shape decoding module 64 decodes the shape or contour for the current object being processed. To accomplish this, it employs a shape decoder that implements the inverse of the shape encoding method used in the encoder of FIG. 1. The resulting shape data is a mask, such as a binary alpha plane or gray scale alpha plane representing the shape of the object.

The motion decoding module 66 decodes the motion information in the bit stream. The decoded motion information includes the motion vectors for each macroblock that are reconstructed from entropy codes in the incoming bitstream. The motion decoding module 66 provides this motion information to the motion compensation module 68, and the motion compensation module 68 uses the motion vectors to find predicted image samples in the previously reconstructed object data 70.

The texture decoding module 74 decodes error signals for inter-frame coded texture data and an array of color values for intra-frame texture data and passes this information to a module 72 for computing and accumulating the reconstructed image. For inter-frame coded objects, this module 72 applies the error signal data to the predicted image output from the motion compensation module to compute the reconstructed object for the current frame. For intra-frame coded objects the texture decoding module 74 decodes the image sample values for the object and places the reconstructed object in the reconstructed object module 72. Previously reconstructed objects are temporarily stored in object memory 70 and are used to construct the object for other frames.

Like the encoder, the decoder can be implemented in hardware, software or a combination of both. In software implementations, the modules in the decoder are software instructions stored in memory of a computer and executed by the processor, and video data stored in memory. A software decoder can be stored and distributed on a variety of conventional computer readable media. In hardware implementations, the decoder modules are implemented in digital logic, preferably in an integrated circuit. Some of the decoder functions can be optimized in special-purpose digital logic devices in a computer peripheral to off-load the processing burden from a host computer.

Improved Coding of Motion Vectors

The coding efficiency of motion vectors can be improved by exploiting the correlation between the X and Y components of a motion vector. Traditional coding methods code the X and Y components separately based on the premise that the probability distribution of the X and Y components are independent. We have discovered that the X and Y components are not totally independent, but instead, have a correlation.

To take advantage of this correlation, an implementation of the invention assigns a single entropy code to the joint X and Y components of a motion vector. Before coding, sample video data for a target bit rate and content scenario is used to generate a codebook. This codebook assigns a single variable length code to pairs of X and Y components based on their frequency of occurrence. More frequent, and therefore statistically more probable pairs, are assigned shorter length codes, while less frequent pairs are assigned longer length codes. A statistical analysis program computes the probability of each of the joint X and Y components by extracting the motion vector data generated from an encoder for several example video sequences that have the desired type of content. The program creates a probability distribution for pairs of motion vectors (namely, differential motion vectors) and then assigns codes to a subset of the motion vectors that are most probable.

To limit the size of the codebook, low probability pairs need not be assigned a code. Instead, these pairs can be coded by using an escape code to indicate that the motion vector components follow in fix length bit fields. Pairs are excluded from the codebook based on where they fall in the probability distribution.

While not required, the coding of motion vectors can be improved by using a differential coding process that takes advantage of the spatial dependency of motion vectors. In particular, a motion vector for a small block of pixels is likely to point in a similar direction as the motion vector for a neighboring block, especially if both the current block and its neighbor are in a region of the frame having nearly uniform motion. One way to take advantage of this spatial dependency is to code the difference between a motion vector for the current block and the motion vector for a neighboring block, called the predictor. The implementation uses a form of spatial prediction to encode the X and Y components before assigning a joint entropy code.

FIG. 3 is a block diagram illustrating how our implementation encodes motion vectors. The features shown in FIG. 3 are implemented in the encoder and operate on the motion vectors computed in the motion estimation block 34. First, the motion estimation block computes a motion vector for each macroblock in the frame. When a frame consists of more than one video object plane, the motion estimation block computes motion vectors for the macroblocks of each video object plane.

The encoder begins coding the motion vector for each macroblock by computing a predictor for the current motion vector. The implementation shown in FIG. 3 selects a predictor from among neighboring macroblocks. FIG. 4 shows an example of the positioning of the candidates for the predictor relative to the current macroblock for which the motion vector is being encoded. In this example, the candidate macroblocks include the ones to the left 400, above 402, and above-right 404 relative to the current macroblock 406. The motion vectors for the candidate macroblocks are referred to as MV1, MV2, and MV3, respectively.

As shown in FIG. 3, the encoder computes the predictor separately for the X and Y components of the current macroblock. In particular, the motion vector predictors 300, 302 compute the median of the X and Y components for the candidate macroblocks. The median of these three values is chosen as the predictor for the X and Y components. The precise method of computing the predictor is not critical to the invention and other ways of selecting a predictor are possible. One alternative is to select a neighboring block located in the direction of the lowest gradient of the neighboring motion vectors. Another alternative is to compute an average of motion vectors of neighboring blocks.

Once the motion vector predictor selects the predictor, the encoder computes differential motion vector components. For each X and Y component, the encoder computes the difference between the component of the current motion vector and the corresponding component of the predictor. As reflected by subtractor units 304, 306 in FIG. 3, the X component of the predictor is subtracted from the X component of the current vector MVx, and the Y component of the predictor is subtracted from the Y component of the current vector MVy.

The resulting differential X and Y components (MVDx and MVDy) are then formed into a joint parameter that is coded with a single variable length code, or an escape code followed by fixed code word for each differential component. The implementation uses a joint Huffman coding table that is trained for a target bit rate and video content. The joint entropy coder 308 looks up the joint parameter in the table to find a corresponding variable length code. If the coder finds a match in the table, it codes the joint parameter with a single variable length code. Otherwise, it codes an escape code followed by a fixed length code word for each component.

The entropy codes 310 shown in FIG. 3 refer to the Huffman coding table. An example of a Huffman coding table trained for low bit rate, talking head applications is set forth at the end of this section in Table 1. Following Table 1, Table 2 is an example of a Huffman table trained for more general video applications. While our implementation uses Huffman coding tables, the entropy codes can be computed using other forms of entropy coding such as arithmetic coding.

Since the predictor is selected from motion vectors of neighboring blocks of pixels, the encoder applies special rules to address the situation where one or more neighboring blocks are outside the picture. FIG. 5 illustrates cases where a neighboring block is outside the picture and shows the motion vectors that are used to predict the motion vector in the current macroblock.

If one neighboring block is outside the picture (e.g., block 500 in FIG. 5), a zero motion vector (0,0) is used in its place. The predictor of the current macroblock 506 is computed as the median of the zero motion vector, and motion vectors MV2 and MV3 for the other two neighboring macroblocks 502, 504. As another example, the configuration on the far right of FIG. 5 shows the case where the above-right macroblock 524 is out of the picture. In this case, MV1 and MV2 for the other two macroblocks 520, 522 inside the picture are used along with the zero motion vector for the third macroblock 524 to predict the motion vector for the current macroblock 526.

If two candidate macroblocks 512, 514 are out of the picture (as shown in the middle diagram of FIG. 5), then the motion vector for the third neighboring macroblock 510 is selected as the predictor for the current macroblock 516.

Figure 6:
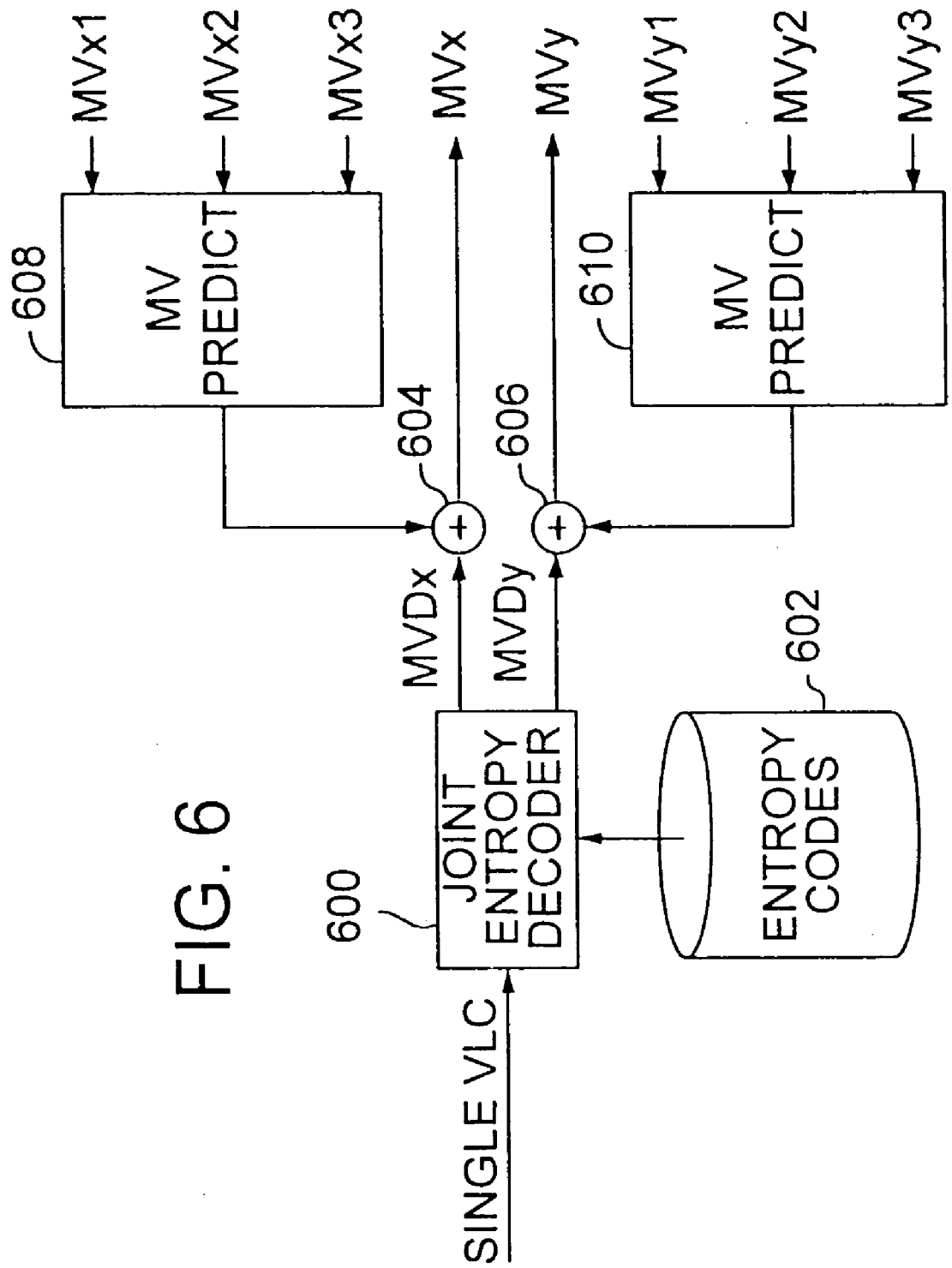
FIG. 6 is a block diagram illustrating how an implementation of the invention decodes a jointly coded motion vector.

FIG. 6 is a diagram illustrating an implementation of a decoder for decoding a single variable length code representing joint motion vector components into X and Y motion vector components. The joint entropy decoder 600 reads the variable length code as input and finds the corresponding differential X and Y components in the entropy codes 602. In the current implementation, the entry codes are in the form of a Huffman table (e.g., tables 1 or 2 listed below). As noted above, the encoder can also use an alternative entropy coding scheme, in which case, the decoder would have the appropriate codebook to correspond with the codebook used in the encoder.

In some cases, the motion vector may be coded with an escape code followed by two fixed length codes representing the differential motion vector components. In this case, the joint entropy decoder 600 recognizes the escape code and interprets the following data as differential motion vectors instead of a variable length code. It then passes the differential X and Y components to the next stage.

Next, the decoder forms the motion vector from the differential motion vector components MVDx, MVDy and the X and Y components of the predictor. In particular the decoder adds each differential motion vector component MVDx, MVDy and the X and Y components of the predictor (see adders 604, 606, FIG. 6). The decoder computes the predictor components in the same way as the encoder. In particular, it has a motion vector predictor that computes the predictor of the motion vectors previously decoded for the three neighboring macroblocks (MVx1, MVy) (MVx2, MVy2) and (MVx3, MVy3). In the implementation, the motion vector predictor blocks 608, and 610 represent the computation of the median of the X and Y components, respectively, of the neighboring macroblocks. As noted above, other ways of computing the predictor are possible. Regardless of the specific form of prediction, the decoder performs inverse prediction according to the prediction scheme used in the encoder.

Once the motion vector for the current macroblock (MVx, MVy) is reconstructed, it is stored and used to decode the motion vector for neighboring macroblocks according to the prediction scheme.

The following tables provide examples of Huffman coding tables trained for talking head video (Table 1) and more general video content (Table 2).

TABLE 1

XY Joint VLC Motion Vector Table for Talking Head Video

| Index | Mv_x | Mv_y | Number of bits | Code |
|---|---|---|---|---|
| 0 | 0 | 0 | 1 | 1 |
| 1 | 0 | −0.5 | 4 | 0011 |
| 2 | −0.5 | 0 | 4 | 0101 |
| 3 | 0 | 0.5 | 4 | 0111 |
| 4 | 0.5 | 0 | 5 | 00010 |
| 5 | −0.5 | −0.5 | 5 | 01000 |
| 6 | 0.5 | −0.5 | 5 | 01101 |
| 7 | −0.5 | 0.5 | 6 | 000000 |
| 8 | 0.5 | 0.5 | 6 | 000001 |
| 9 | 0 | 1 | 6 | 011001 |
| 10 | 1 | 0 | 7 | 0000101 |
| 11 | 0 | −1 | 7 | 0001111 |
| 12 | −1 | 0 | 7 | 0010110 |
| 13 | 0 | 1.5 | 8 | 00001001 |
| 14 | −0.5 | 1 | 8 | 00001101 |
| 15 | 1 | −0.5 | 8 | 00001110 |
| 16 | 1.5 | 0 | 8 | 00011011 |
| 17 | 0 | −1.5 | 8 | 00011101 |
| 18 | 1 | 0.5 | 8 | 00100001 |
| 19 | 0.5 | −1 | 8 | 00100110 |
| 20 | −1.5 | 0 | 8 | 00101000 |
| 21 | 0.5 | 1 | 8 | 00101010 |
| 22 | −1 | 0.5 | 8 | 00101110 |
| 23 | −1 | −0.5 | 8 | 01001100 |
| 24 | −0.5 | −1 | 8 | 01001101 |
| 25 | −0.5 | 1.5 | 9 | 000010001 |
| 26 | 1.5 | −0.5 | 9 | 000110000 |
| 27 | −1.5 | −0.5 | 9 | 000110001 |
| 28 | 0.5 | −1.5 | 9 | 000110011 |
| 29 | 1.5 | 0.5 | 9 | 000110101 |
| 30 | 0.5 | 1.5 | 9 | 001000000 |
| 31 | 1 | −1 | 9 | 001001010 |
| 32 | −0.5 | −1.5 | 9 | 001001011 |
| 33 | −1.5 | 0.5 | 9 | 001010010 |
| 34 | −1 | 1 | 9 | 001011110 |
| 35 | 1 | 1 | 9 | 010010010 |
| 36 | −1 | −1 | 9 | 011000000 |
| 37 | 2 | 0 | 10 | 0000110011 |
| 38 | −2 | 0 | 10 | 0000111111 |
| 39 | 0 | 2 | 10 | 0001101000 |
| 40 | 1 | −1.5 | 10 | 0001110000 |
| 41 | 2.5 | 0 | 10 | 0001110001 |
| 42 | −1 | 1.5 | 10 | 0010010000 |
| 43 | −2.5 | 0 | 10 | 0010011100 |
| 44 | 0 | −2 | 10 | 0010011101 |
| 45 | −3.5 | 0 | 10 | 0010011111 |
| 46 | 3.5 | 0 | 10 | 0010101100 |
| 47 | 0 | −2.5 | 10 | 0010101101 |
| 48 | 1 | 1.5 | 10 | 0100010010 |
| 49 | 0 | 2.5 | 10 | 0100100011 |
| 50 | 1.5 | 1 | 10 | 0100101000 |
| 51 | 1.5 | −1.5 | 10 | 0100111001 |
| 52 | 1.5 | −1 | 10 | 0100111011 |
| 53 | −0.5 | 2 | 10 | 0110000011 |
| 54 | 1.5 | 1.5 | 10 | 0110000101 |
| 55 | −1.5 | 1 | 10 | 0110000110 |
| 56 | 0 | −3.5 | 10 | 0110001000 |
| 57 | −1.5 | −1 | 10 | 0110001001 |
| 58 | −1 | −1.5 | 10 | 0110001111 |
| 59 | −1.5 | 1.5 | 11 | 00001000001 |
| 60 | 2.5 | 0.5 | 11 | 00001100001 |
| 61 | −2.5 | −0.5 | 11 | 00001100010 |

TABLE 1-continued

XY Joint VLC Motion Vector Table for Talking Head Video

| Index | Mv_x | Mv_y | Number of bits | Code |
|---|---|---|---|---|
| 62 | 2 | −0.5 | 11 | 00001111101 |
| 63 | 3 | 0 | 11 | 00011001000 |
| 64 | 2.5 | −0.5 | 11 | 00011010011 |
| 65 | 0.5 | −2 | 11 | 00011100100 |
| 66 | 0 | 3.5 | 11 | 00011100111 |
| 67 | −0.5 | −2 | 11 | 00100000100 |
| 68 | −1.5 | −1.5 | 11 | 00100000101 |
| 69 | −0.5 | 2.5 | 11 | 00100100100 |
| 70 | −2 | −0.5 | 11 | 00100100101 |
| 71 | 2 | 0.5 | 11 | 00100111100 |
| 72 | 0.5 | −2.5 | 11 | 00100111101 |
| 73 | −1 | 2 | 11 | 00101001111 |
| 74 | 1 | −2 | 11 | 00101111100 |
| 75 | 0.5 | 2 | 11 | 00101111101 |
| 76 | 0.5 | 2.5 | 11 | 00101111110 |
| 77 | −2 | 0.5 | 11 | 01001000000 |
| 78 | −2.5 | 0.5 | 11 | 01001001100 |
| 79 | −3.5 | −0.5 | 11 | 01001001111 |
| 80 | −0.5 | −2.5 | 11 | 01001010110 |
| 81 | −3 | 0 | 11 | 01001011100 |
| 82 | 3.5 | −0.5 | 11 | 01001110001 |
| 83 | 0 | 3 | 11 | 01001110100 |
| 84 | 0 | −3 | 11 | 01100010110 |
| 85 | −0.5 | −3.5 | 11 | 01100010111 |
| 86 | 0.5 | −3.5 | 11 | 01100011101 |
| 87 | 3.5 | 0.5 | 11 | 01100011100 |
| 88 | −0.5 | 3.5 | 12 | 000010000100 |
| 89 | 3 | −0.5 | 12 | 000010000101 |
| 90 | −2 | 1 | 12 | 000010000111 |
| 91 | 2 | −1 | 12 | 000011001000 |
| 92 | −5.5 | 0 | 12 | 000011001001 |
| 93 | −4.5 | 0 | 12 | 000011001010 |
| 94 | 5.5 | 0 | 12 | 000011001011 |
| 95 | 2 | 1 | 12 | 000011110001 |
| 96 | 1 | 2 | 12 | 000011110010 |
| 97 | 4.5 | 0 | 12 | 000011111000 |
| 98 | −1 | −2 | 12 | 000110010101 |
| 99 | −3.5 | 0.5 | 12 | 000110100101 |
| 100 | −2 | −1 | 12 | 000111001101 |
| 101 | −0.5 | 3 | 12 | 001000001101 |
| 102 | −1 | 2.5 | 12 | 001001000111 |
| 103 | 1 | −2.5 | 12 | 001001001101 |
| 104 | 3 | 0.5 | 12 | 001010011101 |
| 105 | 1.5 | −2 | 12 | 001010111000 |
| 106 | 14.5 | 0 | 12 | 001010111111 |
| 107 | 1 | 2.5 | 12 | 010010011010 |
| 108 | −2 | 1.5 | 12 | 010010011100 |
| 109 | −1 | 3 | 12 | 010010100111 |
| 110 | 2.5 | −1.5 | 12 | 010010101000 |
| 111 | 2.5 | 1 | 12 | 010010101011 |
| 112 | 1.5 | −2.5 | 12 | 010010101110 |
| 113 | −2.5 | −1.5 | 12 | 010010101111 |
| 114 | 2 | −1.5 | 12 | 010010110101 |
| 115 | −14.5 | 0 | 12 | 010010110110 |
| 116 | 13.5 | 0 | 12 | 010010110111 |
| 117 | 3 | 1 | 12 | 010010111100 |
| 118 | 2.5 | 1.5 | 12 | 010010111110 |
| 119 | 0 | −14.5 | 12 | 010010111111 |
| 120 | −0.5 | −3 | 12 | 010011100001 |
| 121 | −1.5 | 2 | 12 | 010011111100 |
| 122 | −3 | −0.5 | 12 | 010011111101 |
| 123 | 0.5 | 3 | 12 | 010011111111 |
| 124 | 2.5 | −1 | 12 | 011000001000 |
| 125 | 0.5 | −3 | 12 | 011000001001 |
| 126 | −2.5 | 1.5 | 12 | 011000001010 |
| 127 | −2.5 | 1 | 12 | 011000001011 |
| 128 | 1.5 | 2.5 | 12 | 011000010000 |
| 129 | 1 | −3 | 12 | 011000011100 |
| 130 | 1 | −3.5 | 12 | 011000011110 |
| 131 | 4 | 0 | 12 | 011000011111 |
| 132 | 5 | 0 | 12 | 011000101010 |
| 133 | 0.5 | 3.5 | 12 | 011000101011 |
| 134 | 0 | −4.5 | 12 | 011000110000 |
| 135 | −1.5 | 2.5 | 12 | 011000110111 |
| 136 | −14 | 0 | 12 | 011000111010 |

TABLE 1-continued

XY Joint VLC Motion Vector Table for Talking Head Video

| Index | Mv_x | Mv_y | Number of bits | Code |
|---|---|---|---|---|
| 137 | −13.5 | 0 | 13 | 0000100000000 |
| 138 | −2 | −1.5 | 13 | 0000100000001 |
| 139 | −4 | 0 | 13 | 0000100001100 |
| 140 | −3.5 | −1.5 | 13 | 0000110000011 |
| 141 | 1.5 | 2 | 13 | 0000110001110 |
| 142 | 3.5 | −1.5 | 13 | 0000111100000 |
| 143 | 3 | −1 | 13 | 0000111100001 |
| 144 | 0 | 4.5 | 13 | 0000111101111 |
| 145 | −4.5 | −0.5 | 13 | 0000111110010 |
| 146 | −2.5 | −1 | 13 | 0000111110011 |
| 147 | 0 | −5.5 | 13 | 0001100100101 |
| 148 | −1 | 3.5 | 13 | 0001100100110 |
| 149 | 1.5 | −3.5 | 13 | 0001100100111 |
| 150 | −3 | 1 | 13 | 0001100101000 |
| 151 | 1 | 3 | 13 | 0001100101001 |
| 152 | 14 | 0 | 13 | 0001101001001 |
| 153 | 2 | 1.5 | 13 | 0001110010100 |
| 154 | −1.5 | 3.5 | 13 | 0001110010101 |
| 155 | −5 | 0 | 13 | 0001110011001 |
| 156 | −3 | 0.5 | 13 | 0010000011000 |
| 157 | 4.5 | 0.5 | 13 | 0010010011000 |
| 158 | −12.5 | 0 | 13 | 0010010011001 |
| 159 | −1 | −2.5 | 13 | 0010010011100 |
| 160 | 3 | −1.5 | 13 | 0010010011110 |
| 161 | −1 | −3.5 | 13 | 0010010011111 |
| 162 | 2 | −2 | 13 | 0010100110000 |
| 163 | −1.5 | −2.5 | 13 | 0010100110010 |
| 164 | −1 | −3 | 13 | 0010101110011 |
| 165 | 4.5 | −0.5 | 13 | 0010101110100 |
| 166 | −3 | −1 | 13 | 0010101110101 |
| 167 | −3.5 | 1.5 | 13 | 0010101111011 |
| 168 | 0 | −4 | 13 | 0010101111111 |
| 169 | 1 | −4 | 13 | 0010111111100 |
| 170 | −4 | −0.5 | 13 | 0100100001111 |
| 171 | 3.5 | 1 | 13 | 0100100110110 |
| 172 | −15.5 | 0 | 13 | 0100101001010 |
| 173 | −3.5 | −1 | 13 | 0100101001011 |
| 174 | 3.5 | 1.5 | 13 | 0100101001100 |
| 175 | 0 | 4 | 13 | 0100101010010 |
| 176 | −2 | −2 | 13 | 0100101010011 |
| 177 | −1.5 | 3 | 13 | 0100101010100 |
| 178 | 0 | −13.5 | 13 | 0100101010101 |
| 179 | 3 | 1.5 | 13 | 0100101101000 |
| 180 | −3 | −1.5 | 13 | 0100101101001 |
| 181 | 2 | 2 | 13 | 0100101101101 |
| 182 | −2 | 2 | 13 | 0100101110110 |
| 183 | 15.5 | 0 | 13 | 0100101110111 |
| 184 | −2 | 3 | 13 | 0100101111011 |
| 185 | 3.5 | −1 | 13 | 0100111000000 |
| 186 | −4.5 | 0.5 | 13 | 0100111010001 |
| 187 | −5.5 | −0.5 | 13 | 0100111110110 |
| 188 | −3 | 1.5 | 13 | 0100111110111 |
| 189 | 1.5 | −3 | 13 | 0100111111100 |
| 190 | −0.5 | −4.5 | 13 | 0100111111101 |
| 191 | 1.5 | 3 | 13 | 0110000100110 |
| 192 | 12.5 | 0 | 13 | 0110000100111 |
| 193 | −0.5 | 4.5 | 13 | 0110000111010 |
| 194 | −1.5 | −2 | 13 | 0110001010000 |
| 195 | −1.5 | −3.5 | 13 | 0110001010001 |
| 196 | −2 | 2.5 | 13 | 0110001010010 |
| 197 | −1 | 4 | 13 | 0110001010011 |
| 198 | −2.5 | 2.5 | 13 | 0110001110110 |
| 199 | 1.5 | 3.5 | 14 | 00001000000100 |
| 200 | −15 | 0 | 14 | 00001000000101 |
| 201 | 3 | 2 | 14 | 00001000000110 |
| 202 | 4 | 0.5 | 14 | 00001100000001 |
| 203 | 1 | 3.5 | 14 | 00001100000010 |
| 204 | 2.5 | −3.5 | 14 | 00001100000011 |
| 205 | −1.5 | −3 | 14 | 00001100000100 |
| 206 | 3 | −2 | 14 | 00001100000101 |
| 207 | 5.5 | −0.5 | 14 | 00001100011000 |
| 208 | −3 | −2 | 14 | 00001100011001 |
| 209 | 0 | 5 | 14 | 00001100011010 |
| 210 | 0.5 | −4.5 | 14 | 00001100011011 |
| 211 | 5 | −0.5 | 14 | 00001100011110 |
| 212 | −4 | 0.5 | 14 | 00001111011010 |
| 213 | 4 | −0.5 | 14 | 00001111011011 |
| 214 | −2 | 3.5 | 14 | 00001111011100 |
| 215 | 0 | −15.5 | 14 | 00001111011101 |
| 216 | 0 | 13.5 | 14 | 00011001001000 |
| 217 | 0 | −5 | 14 | 00011001001001 |
| 218 | 2 | −2.5 | 14 | 00011001011110 |
| 219 | 0 | −14 | 14 | 00011001011111 |
| 220 | 5.5 | 0.5 | 14 | 00011010010000 |
| 221 | −3.5 | 1 | 14 | 00011010010001 |
| 222 | −5.5 | 0.5 | 14 | 00011100101101 |
| 223 | −0.5 | −4 | 14 | 00011100101110 |
| 224 | −1 | 4.5 | 14 | 00011100101111 |
| 225 | −0.5 | −14.5 | 14 | 00011100110000 |
| 226 | 4.5 | 1.5 | 14 | 00011100110001 |
| 227 | −1.5 | 4.5 | 14 | 00100100011010 |
| 228 | 0.5 | 4.5 | 14 | 00100100011011 |
| 229 | 2.5 | −2 | 14 | 00100100111010 |
| 230 | −3 | 2 | 14 | 00100100111011 |
| 231 | 2.5 | 2 | 14 | 00101001100100 |
| 232 | −2.5 | −2 | 14 | 00101001110001 |
| 233 | 13.5 | 0.5 | 14 | 00101001110010 |
| 234 | −4.5 | 1.5 | 14 | 00101001110011 |
| 235 | 0.5 | −5.5 | 14 | 00101011100100 |
| 236 | 1.5 | −4.5 | 14 | 00101011101100 |
| 237 | −0.5 | −5.5 | 14 | 00101011101101 |
| 238 | −0.5 | −5 | 14 | 00101011101110 |
| 239 | 2.5 | 2.5 | 14 | 00101011101111 |
| 240 | 3 | −2.5 | 14 | 00101011110000 |
| 241 | 3.5 | −2.5 | 14 | 00101011110001 |
| 242 | 0 | 5.5 | 14 | 00101011110010 |
| 243 | −4.5 | −1.5 | 14 | 00101011110011 |
| 244 | 0 | 14 | 14 | 00101011110100 |
| 245 | −2.5 | 3.5 | 14 | 00101011110101 |
| 246 | 2.5 | −2.5 | 14 | 00101011111100 |
| 247 | 2 | −3.5 | 14 | 01001000010101 |
| 248 | −0.5 | 13.5 | 14 | 01001000010110 |
| 249 | 4 | 1 | 14 | 01001000010111 |
| 250 | −3.5 | −2.5 | 14 | 01001000011000 |
| 251 | −2.5 | −2.5 | 14 | 01001000011001 |
| 252 | 3 | −3 | 14 | 01001000011010 |
| 253 | −0.5 | 4 | 14 | 01001000011011 |
| 254 | 2 | 2.5 | 14 | 01001000011100 |
| 255 | −2 | −2.5 | 14 | 01001000011101 |
| 256 | −0.5 | 14.5 | 14 | 01001001101111 |
| 257 | 2 | −3 | 14 | 01001001110100 |
| 258 | −3.5 | 3.5 | 14 | 01001001110101 |
| 259 | 6.5 | 0.5 | 14 | 01001001110110 |
| 260 | −14.5 | −0.5 | 14 | 01001001110111 |
| 261 | 1 | −5 | 14 | 01001010010000 |
| 262 | 3 | 2.5 | 14 | 01001010010001 |
| 263 | 3.5 | −3.5 | 14 | 01001010010010 |
| 264 | 4 | −1 | 14 | 01001010010011 |
| 265 | 3 | −3.5 | 14 | 01001010011010 |
| 266 | −1 | −4 | 14 | 01001011001010 |
| 267 | 0 | 14.5 | 14 | 01001011001011 |
| 268 | −6.5 | −0.5 | 14 | 01001011001100 |
| 269 | −4 | 1 | 14 | 01001011001101 |
| 270 | −3.5 | −3.5 | 14 | 01001011001110 |
| 271 | −3 | 3 | 14 | 01001011001111 |
| 272 | 6.5 | 0 | 14 | 01001011101000 |
| 273 | −6 | 0 | 14 | 01001011101001 |
| 274 | −4 | −1 | 14 | 01001011110100 |
| 275 | 0.5 | −14.5 | 14 | 01001011110101 |
| 276 | 0.5 | 14.5 | 14 | 01001111011101 |
| 277 | −0.5 | 5.5 | 14 | 01001111011110 |
| 278 | 4.5 | −1.5 | 14 | 01001111011111 |
| 279 | 1 | −4.5 | 14 | 01001111100000 |
| 280 | 3.5 | −2 | 14 | 01001111100001 |
| 281 | 7.5 | 0 | 14 | 01001111100010 |
| 282 | 4 | −2 | 14 | 01001111100011 |
| 283 | 13 | 0 | 14 | 01001111100100 |
| 284 | 13.5 | −0.5 | 14 | 01001111100101 |
| 285 | 4.5 | 1 | 14 | 01001111100110 |
| 286 | 0.5 | −13.5 | 14 | 01001111100111 |

TABLE 1-continued

XY Joint VLC Motion Vector Table for Talking Head Video

| Index | Mv_x | Mv_y | Number of bits | Code |
|---|---|---|---|---|
| 287 | −14.5 | 0.5 | 14 | 01001111101000 |
| 288 | −7.5 | 0 | 14 | 01001111101001 |
| 289 | 14.5 | 0.5 | 14 | 01001111101010 |
| 290 | 5 | 0.5 | 14 | 01001111101011 |
| 291 | −1 | 5 | 14 | 01100001000100 |
| 292 | −3 | 2.5 | 14 | 01100001000101 |
| 293 | −1.5 | −4.5 | 14 | 01100001000110 |
| 294 | 2 | 3 | 14 | 01100001000111 |
| 295 | 14.5 | −0.5 | 14 | 01100001001000 |
| 296 | 0.5 | 4 | 14 | 01100001001001 |
| 297 | 2.5 | −3 | 14 | 01100001001010 |
| 298 | 15 | 0 | 14 | 01100001001011 |
| 299 | −2 | −3 | 14 | 01100001110110 |
| 300 | −3.5 | 2.5 | 14 | 01100011011001 |
| 301 | 3 | 3 | 14 | 01100011011010 |
| 302 | −3.5 | 2 | 14 | 01100011101011 |
| 303 | 3 | −4 | 14 | 01100011101110 |
| 304 | −7.5 | −1.5 | 14 | 01100011101111 |
| 305 | −4.5 | −1 | 15 | 000010000001110 |
| 306 | 1 | −6 | 15 | 000010000001111 |
| 307 | 0.5 | −5 | 15 | 000010000110100 |
| 308 | −5.5 | −1.5 | 15 | 000010000110101 |
| 309 | 0.5 | −4 | 15 | 000010000110110 |
| 310 | 8.5 | 0 | 15 | 000010000110111 |
| 311 | −2.5 | 4.5 | 15 | 000011000000000 |
| 312 | 0 | −15 | 15 | 000011000000001 |
| 313 | −4.5 | 1 | 15 | 000011110101001 |
| 314 | −2.5 | −3.5 | 15 | 000011110101010 |
| 315 | −5 | 0.5 | 15 | 000011110101011 |
| 316 | −4 | −1.5 | 15 | 000011110101100 |
| 317 | −5 | −0.5 | 15 | 000011110101101 |
| 318 | 3.5 | 3.5 | 15 | 000011110101110 |
| 319 | 5.5 | 1.5 | 15 | 000011110101111 |
| 320 | −2.5 | 2 | 15 | 000011110110000 |
| 321 | 2.5 | −4 | 15 | 000011110110001 |
| 322 | −13 | 0 | 15 | 000011110110010 |
| 323 | 5 | −1 | 15 | 000011110110011 |
| 324 | 7.5 | 0.5 | 15 | 000110010110000 |
| 325 | −3 | −2.5 | 15 | 000110010110001 |
| 326 | −1 | 6 | 15 | 000110010110010 |
| 327 | −0.5 | 14 | 15 | 000110010110011 |
| 328 | 4.5 | −1 | 15 | 000110010110100 |
| 329 | 3.5 | 2 | 15 | 000110010110101 |
| 330 | 0.5 | −6.5 | 15 | 000110010110110 |
| 331 | −5 | 1 | 15 | 000110010110111 |
| 332 | 6.5 | −0.5 | 15 | 000110010111000 |
| 333 | 2 | −4 | 15 | 000110010111001 |
| 334 | 0 | −8 | 15 | 000110010111010 |
| 335 | 6.5 | 1.5 | 15 | 000110010111011 |
| 336 | −6.5 | 0 | 15 | 000111001011000 |
| 337 | −5 | 3 | 15 | 001001000100100 |
| 338 | −1 | −5.5 | 15 | 001001000100101 |
| 339 | −13.5 | 0.5 | 15 | 001001000100110 |
| 340 | −13.5 | −0.5 | 15 | 001001000100111 |
| 341 | −7.5 | −0.5 | 15 | 001001000101000 |
| 342 | −1.5 | −5.5 | 15 | 001001000101001 |
| 343 | −5 | 1.5 | 15 | 001001000101010 |
| 344 | −0.5 | −13.5 | 15 | 001001000101011 |
| 345 | −0.5 | −7.5 | 15 | 001001000101100 |
| 346 | 5.5 | −1.5 | 15 | 001001000101101 |
| 347 | 2.5 | 3 | 15 | 001001000101110 |
| 348 | −2.5 | 3 | 15 | 001001000101111 |
| 349 | 0 | −7 | 15 | 001001000110000 |
| 350 | 0 | 13 | 15 | 001001000110001 |
| 351 | 0 | −6.5 | 15 | 001001000110010 |
| 352 | 0.5 | 5.5 | 15 | 001001000110011 |
| 353 | 1 | 4.5 | 15 | 001010011000110 |
| 354 | 5.5 | −1 | 15 | 001010011000111 |
| 355 | 1.5 | 4.5 | 15 | 001010011001100 |
| 356 | −1.5 | 5.5 | 15 | 001010011001101 |
| 357 | −3 | 3.5 | 15 | 001010011001110 |
| 358 | −5 | −1.5 | 15 | 001010011001111 |
| 359 | 0 | −12.5 | 15 | 001010011010000 |
| 360 | −6.5 | −1.5 | 15 | 001010011010001 |
| 361 | 0 | −7.5 | 15 | 001010011010010 |
| 362 | −3.5 | −2 | 15 | 001010011010011 |
| 363 | −0.5 | −6.5 | 15 | 001010011010100 |
| 364 | 4.5 | −2 | 15 | 001010011010101 |
| 365 | 8.5 | −0.5 | 15 | 001010011010110 |
| 366 | −2 | −3.5 | 15 | 001010011010111 |
| 367 | 1 | −6.5 | 15 | 001010011011000 |
| 368 | −2 | 4 | 15 | 001010011011001 |
| 369 | 3.5 | −3 | 15 | 001010011011010 |
| 370 | 1 | −5.5 | 15 | 001010011011011 |
| 371 | −6.5 | 0.5 | 15 | 001010011011100 |
| 372 | 2.5 | 3.5 | 15 | 001010011011101 |
| 373 | 3 | −4.5 | 15 | 001010011011110 |
| 374 | −1.5 | 4 | 15 | 001010011011111 |
| 375 | −5.5 | −1 | 15 | 001010011100000 |
| 376 | 2 | 3.5 | 15 | 001010011100001 |
| 377 | 5 | 1 | 15 | 001010111011000 |
| 378 | −4 | 1.5 | 15 | 010010000011011 |
| 379 | 8 | 0 | 15 | 010010000011100 |
| 380 | −8 | 0 | 15 | 010010000011101 |
| 381 | −2 | −4 | 15 | 010010000011110 |
| 382 | 8.5 | 0.5 | 15 | 010010000011111 |
| 383 | −5 | −1 | 15 | 010010000100000 |
| 384 | 1 | 4 | 15 | 010010000100001 |
| 385 | −0.5 | 7.5 | 15 | 010010000100010 |
| 386 | 3 | 3.5 | 15 | 010010000100011 |
| 387 | 3.5 | 2.5 | 15 | 010010000100100 |
| 388 | 6 | 0 | 15 | 010010000100101 |
| 389 | −10.5 | 0.5 | 15 | 010010000100110 |
| 390 | 1.5 | −4 | 15 | 010010000100111 |
| 391 | −1 | −4.5 | 15 | 010010000101000 |
| 392 | 0.5 | 6.5 | 15 | 010010000101001 |
| 393 | 0.5 | 7.5 | 15 | 010010011011100 |
| 394 | −4.5 | −2.5 | 15 | 010010011011101 |
| 395 | −2 | −4.5 | 15 | 010010100110110 |
| 396 | 0.5 | 5 | 15 | 010010100110111 |
| 397 | 7 | 0 | 15 | 010010110000000 |
| 398 | −8.5 | 0 | 15 | 010010110000001 |
| 399 | −9.5 | 0.5 | 15 | 010010110000010 |
| 400 | −4 | 2 | 15 | 010010110000011 |
| 401 | 4.5 | 2.5 | 15 | 010010110000100 |
| 402 | −4 | 2.5 | 15 | 010010110000101 |
| 403 | 1 | −7.5 | 15 | 010010110000110 |
| 404 | 1 | −7 | 15 | 010010110000111 |
| 405 | −1 | −5 | 15 | 010010110001000 |
| 406 | −3 | 4 | 15 | 010010110001001 |
| 407 | −4 | 3 | 15 | 010010110001010 |
| 408 | −9 | 0 | 15 | 010010110001011 |
| 409 | 14 | −0.5 | 15 | 010010110001100 |
| 410 | −5.5 | 1.5 | 15 | 010010110001101 |
| 411 | −1.5 | −4 | 15 | 010010110001110 |
| 412 | 3.5 | −7.5 | 15 | 010010110001111 |
| 413 | −4.5 | −3.5 | 15 | 010010110010000 |
| 414 | 1.5 | −7.5 | 15 | 010010110010001 |
| 415 | 2.5 | −4.5 | 15 | 010010110010010 |
| 416 | 15.5 | 0.5 | 15 | 010010110010011 |
| 417 | 6.5 | 1 | 15 | 010011110100010 |
| 418 | 0.5 | 9.5 | 15 | 010011110100011 |
| 419 | 1 | 5 | 15 | 010011110100100 |
| 420 | 7.5 | −0.5 | 15 | 010011110100101 |
| 421 | 4.5 | 2 | 15 | 010011110100110 |
| 422 | −5 | 2 | 15 | 010011110100111 |
| 423 | 5 | −1.5 | 15 | 010011110101000 |
| 424 | 1.5 | −5.5 | 15 | 010011110101001 |
| 425 | 1.5 | −5 | 15 | 010011110101010 |
| 426 | −4.5 | 2.5 | 15 | 010011110101011 |
| 427 | 0 | 6 | 15 | 010011110101100 |
| 428 | 1.5 | 5.5 | 15 | 010011110101101 |
| 429 | 5.5 | −3.5 | 15 | 010011110101110 |
| 430 | 0 | 7.5 | 15 | 010011110101111 |
| 431 | −12.5 | 0.5 | 15 | 010011110110000 |
| 432 | −0.5 | 6.5 | 15 | 010011110110001 |
| 433 | 4.5 | −2.5 | 15 | 010011110110010 |
| 434 | −6 | −0.5 | 15 | 010011110110011 |
| 435 | −0.5 | 13 | 15 | 010011110110100 |
| 436 | −8 | −0.5 | 15 | 010011110110101 |

TABLE 1-continued

XY Joint VLC Motion Vector Table for Talking Head Video

| Index | Mv_x | Mv_y | Number of bits | Code |
|---|---|---|---|---|
| 437 | −9.5 | 0 | 15 | 010011110110110 |
| 438 | 15.5 | −0.5 | 15 | 010011110110111 |
| 439 | −3.5 | 3 | 15 | 010011110111000 |
| 440 | −1 | 5.5 | 15 | 010011110111001 |
| 441 | 0 | −6 | 15 | 011000011101110 |
| 442 | 1.5 | 7.5 | 15 | 011000011101111 |
| 443 | −1 | 6.5 | 15 | 011000110001000 |
| 444 | −1 | 11 | 15 | 011000110001001 |
| 445 | −0.5 | −15.5 | 15 | 011000110001010 |
| 446 | 5 | −3 | 15 | 011000110001011 |
| 447 | 7.5 | 1 | 15 | 011000110001100 |
| 448 | 3.5 | 3 | 15 | 011000110001101 |
| 449 | 3 | −9 | 15 | 011000110001110 |
| 450 | 4 | −5 | 15 | 011000110001111 |
| 451 | 4 | −4 | 15 | 011000110100000 |
| 452 | 9.5 | 0.5 | 15 | 011000110100001 |
| 453 | 11.5 | 1 | 15 | 011000110100010 |
| 454 | 12 | 0 | 15 | 011000110100011 |
| 455 | −7 | 0 | 15 | 011000110100100 |
| 456 | −5.5 | 2.5 | 15 | 011000110100101 |
| 457 | 3.5 | −5.5 | 15 | 011000110100110 |
| 458 | 3.5 | −4.5 | 15 | 011000110100111 |
| 459 | 0.5 | 8.5 | 15 | 011000110101000 |
| 460 | −7.5 | 1.5 | 15 | 011000110101001 |
| 461 | 4.5 | −4.5 | 15 | 011000110101010 |
| 462 | −4.5 | −2 | 15 | 011000110101011 |
| 463 | −4 | 3.5 | 15 | 011000110101100 |
| 464 | 5.5 | 3.5 | 15 | 011000110101101 |
| 465 | −3.5 | −4.5 | 15 | 011000110101110 |
| 466 | −0.5 | 11.5 | 15 | 011000110101111 |
| 467 | −6 | 0.5 | 15 | 011000110110000 |
| 468 | −6.5 | −1 | 15 | 011000110110001 |
| 469 | 6.5 | −1 | 16 | 0000110001111100 |
| 470 | −15.5 | 15.5 | 16 | 0000110001111101 |
| 471 | 1 | −8 | 16 | 0000110001111110 |
| 472 | −0.5 | 5 | 16 | 0000110001111111 |
| 473 | −5 | −2 | 16 | 0000111100110000 |
| 474 | 1.5 | −9.5 | 16 | 0000111100110001 |
| 475 | −8.5 | 0.5 | 16 | 0000111100110010 |
| 476 | 7 | 0.5 | 16 | 0000111100110011 |
| 477 | 7 | 1.5 | 16 | 0000111100110100 |
| 478 | 1.5 | −6.5 | 16 | 0000111100110101 |
| 479 | −0.5 | 7 | 16 | 0000111100110110 |
| 480 | −2 | 5.5 | 16 | 0000111100110111 |
| 481 | −1.5 | −7.5 | 16 | 0000111100111000 |
| 482 | −1.5 | −6.5 | 16 | 0000111100111001 |
| 483 | −4.5 | 2 | 16 | 0000111100111010 |
| 484 | 4.5 | 3.5 | 16 | 0000111100111011 |
| 485 | −2.5 | −4 | 16 | 0000111100111100 |
| 486 | −9 | −0.5 | 16 | 0000111100111101 |
| 487 | 10.5 | 0 | 16 | 0000111100111110 |
| 488 | 10.5 | 0.5 | 16 | 0000111100111111 |
| 489 | −2.5 | −3 | 16 | 0000111101000000 |
| 490 | −4 | −2 | 16 | 0000111101000001 |
| 491 | 0 | 15 | 16 | 0000111101000010 |
| 492 | 12.5 | 0.5 | 16 | 0000111101000011 |
| 493 | 0 | 15.5 | 16 | 0000111101000100 |
| 494 | −7.5 | 0.5 | 16 | 0000111101000101 |
| 495 | 5 | 3.5 | 16 | 0000111101000110 |
| 496 | 2.5 | −6.5 | 16 | 0000111101000111 |
| 497 | −1.5 | 8.5 | 16 | 0000111101001000 |
| 498 | 0.5 | −7.5 | 16 | 0000111101001001 |
| 499 | −15.5 | −0.5 | 16 | 0000111101001010 |
| 500 | −3.5 | 5.5 | 16 | 0000111101001011 |
| 501 | 0 | −9.5 | 16 | 0000111101001100 |
| 502 | 0 | −8.5 | 16 | 0000111101001101 |
| 503 | 15.5 | −1.5 | 16 | 0000111101001110 |
| 504 | −3 | −3.5 | 16 | 0000111101001111 |
| 505 | 4 | 1.5 | 16 | 0000111101010000 |
| 506 | 6 | 0.5 | 16 | 0000111101010010 |
| 507 | 2 | −4.5 | 16 | 0001110010110010 |
| 508 | −0.5 | 8.5 | 16 | 0001110010110011 |
| 509 | 3.5 | 4.5 | 16 | 0010000011001000 |
| 510 | −6 | −2 | 16 | 0010000011001001 |
| 511 | −6 | −1.5 | 16 | 0010000011001010 |
| 512 | 6 | 1 | 16 | 0010000011001011 |
| 513 | −4.5 | 3 | 16 | 0010000011001100 |
| 514 | 0.5 | −12.5 | 16 | 0010000011001101 |
| 515 | 1 | 14.5 | 16 | 0010000011001110 |
| 516 | 1.5 | −10.5 | 16 | 0010000011001111 |
| 517 | 0.5 | 9 | 16 | 0010000011100000 |
| 518 | 0.5 | −9.5 | 16 | 0010000011100001 |
| 519 | −2 | 4.5 | 16 | 0010000011100010 |
| 520 | 4.5 | −6.5 | 16 | 0010000011100011 |
| 521 | −4.5 | 7.5 | 16 | 0010000011100100 |
| 522 | 4.5 | −3.5 | 16 | 0010000011100101 |
| 523 | 4.5 | −3 | 16 | 0010000011100110 |
| 524 | −1.5 | −8.5 | 16 | 0010000011100111 |
| 525 | −3.5 | 5 | 16 | 0010000011101000 |
| 526 | −3 | 4.5 | 16 | 0010000011101001 |
| 527 | 8.5 | −1.5 | 16 | 0010000011101010 |
| 528 | −1.5 | 6.5 | 16 | 0010000011101011 |
| 529 | −4 | −2.5 | 16 | 0010000011101100 |
| 530 | 2.5 | −7.5 | 16 | 0010000011101101 |
| 531 | 8.5 | 1.5 | 16 | 0010000011101110 |
| 532 | 9 | 0 | 16 | 0010000011101111 |
| 533 | 9.5 | −1.5 | 16 | 0010000011110000 |
| 534 | 9.5 | 0 | 16 | 0010000011110001 |
| 535 | −3 | −4 | 16 | 0010000011110010 |
| 536 | 3.5 | −9.5 | 16 | 0010000011110011 |
| 537 | −3.5 | −3 | 16 | 0010000011110100 |
| 538 | −3 | −3 | 16 | 0010000011110101 |
| 539 | −8.5 | −0.5 | 16 | 0010000011110110 |
| 540 | 3.5 | −4 | 16 | 0010000011110111 |
| 541 | −7 | 0.5 | 16 | 0010000011111000 |
| 542 | 5 | −2 | 16 | 0010000011111001 |
| 543 | −7.5 | −1 | 16 | 0010000011111010 |
| 544 | −14 | −0.5 | 16 | 0010000011111011 |
| 545 | −0.5 | −10.5 | 16 | 0010000011111100 |
| 546 | 0 | 6.5 | 16 | 0010000011111101 |
| 547 | 0 | 7 | 16 | 0010000011111110 |
| 548 | 14 | 0.5 | 16 | 0010000011111111 |
| 549 | −15.5 | 0.5 | 16 | 0010010001000000 |
| 550 | 5 | 1.5 | 16 | 0010010001000001 |
| 551 | 0 | 12.5 | 16 | 0010010001000010 |
| 552 | −16 | 0 | 16 | 0010010001000011 |
| 553 | −10 | 0 | 16 | 0010010001000100 |
| 554 | −6.5 | 1.5 | 16 | 0010010001000101 |
| 555 | 1.5 | 6.5 | 16 | 0010010001000110 |
| 556 | −5.5 | 1 | 16 | 0010010001000111 |
| 557 | 4.5 | −10.5 | 16 | 0010101110110010 |
| 558 | −7.5 | 2.5 | 16 | 0010101110110011 |
| 559 | −3 | 5 | 16 | 0010101111110100 |
| 560 | −6 | 3.5 | 16 | 0010101111110101 |
| 561 | 6.5 | 2.5 | 16 | 0010101111110110 |
| 562 | 7 | −0.5 | 16 | 0010101111110111 |
| 563 | 0 | 8.5 | 16 | 0010111111101000 |
| 564 | 2.5 | −5.5 | 16 | 0010111111101001 |
| 565 | −5 | −2.5 | 16 | 0010111111101010 |
| 566 | 7.5 | −1.5 | 16 | 0010111111101011 |
| 567 | −1.5 | 7.5 | 16 | 0010111111101100 |
| 568 | −0.5 | 10.5 | 16 | 0010111111101101 |
| 569 | −2.5 | 4 | 16 | 0010111111101110 |
| 570 | −1.5 | 9.5 | 16 | 0010111111101111 |
| 571 | −1 | −8 | 16 | 0010111111110000 |
| 572 | −5.5 | −3 | 16 | 0010111111110001 |
| 573 | 0.5 | −15.5 | 16 | 0010111111110010 |
| 574 | 1.5 | 4 | 16 | 0010111111110011 |
| 575 | −7 | −1 | 16 | 0010111111110100 |
| 576 | −3.5 | 4.5 | 16 | 0010111111110101 |
| 577 | 0.5 | 6 | 16 | 0010111111110110 |
| 578 | 9 | 1 | 16 | 0010111111110111 |
| 579 | 9.5 | −3.5 | 16 | 0010111111111000 |
| 580 | 5 | −2.5 | 16 | 0010111111111001 |
| 581 | −15 | −0.5 | 16 | 0010111111111010 |
| 582 | −8.5 | 1.5 | 16 | 0010111111111011 |
| 583 | 9.5 | 1.5 | 16 | 0010111111111100 |
| 584 | 10.5 | −0.5 | 16 | 0010111111111101 |
| 585 | 0.5 | −8.5 | 16 | 0010111111111110 |
| 586 | −3.5 | 8.5 | 16 | 0010111111111111 |

TABLE 1-continued

XY Joint VLC Motion Vector Table for Talking Head Video

| Index | Mv_x | Mv_y | Number of bits | Code |
|---|---|---|---|---|
| 587 | −1.5 | −15.5 | 16 | 0100100000100000 |
| 588 | 11.5 | 1.5 | 16 | 0100100000100001 |
| 589 | 2.5 | 4 | 16 | 0100100000100010 |
| 590 | 3 | −13.5 | 16 | 0100100000100011 |
| 591 | 0.5 | 13 | 16 | 0100100000100100 |
| 592 | 3 | −5.5 | 16 | 0100100000100101 |
| 593 | 13.5 | −1.5 | 16 | 0100100000100110 |
| 594 | 3 | −5 | 16 | 0100100000100111 |
| 595 | 0.5 | 13.5 | 16 | 0100100000101000 |
| 596 | 3.5 | 6.5 | 16 | 0100100000101001 |
| 597 | −9.5 | −0.5 | 16 | 0100100000101010 |
| 598 | 0 | −11.5 | 16 | 0100100000101011 |
| 599 | 4 | −3 | 16 | 0100100000101100 |
| 600 | 14.5 | −11.5 | 16 | 0100100000101101 |
| 601 | 14.5 | −1.5 | 16 | 0100100000101110 |
| 602 | 0 | −10.5 | 16 | 0100100000101111 |
| 603 | −11.5 | 0 | 16 | 0100100000110000 |
| 604 | 6 | −1 | 16 | 0100100000110001 |
| 605 | −14.5 | −14.5 | 16 | 0100100000110010 |
| 606 | −0.5 | −9.5 | 16 | 0100100000110011 |
| 607 | −1.5 | −6 | 16 | 0100100000110100 |
| 608 | −3.5 | −7 | 16 | 0100100000110101 |
| 609 | −0.5 | −6 | 16 | 0100111010100000 |
| 610 | −2.5 | −10.5 | 16 | 0100111010100001 |
| 611 | −4.5 | −14.5 | 16 | 0100111010100010 |
| 612 | −11.5 | −1.5 | 16 | 0100111010100011 |
| 613 | −3.5 | 4 | 16 | 0100111010100100 |
| 614 | −11.5 | −0.5 | 16 | 0100111010100101 |
| 615 | −1.5 | 10.5 | 16 | 0100111010100110 |
| 616 | −6 | −1 | 16 | 0100111010100111 |
| 617 | −1 | −7.5 | 16 | 0100111010101000 |
| 618 | −1 | −6 | 16 | 0100111010101001 |
| 619 | 5 | 2.5 | 16 | 0100111010101010 |
| 620 | −7 | −0.5 | 16 | 0100111010101011 |
| 621 | −2 | 5 | 16 | 0100111010101100 |
| 622 | −3.5 | 7.5 | 16 | 0100111010101101 |
| 623 | −2 | 7.5 | 16 | 0100111010101110 |
| 624 | −2 | 11 | 16 | 0100111010101111 |
| 625 | −5.5 | 3 | 16 | 0100111010110000 |
| 626 | −1.5 | −11.5 | 16 | 0100111010110001 |
| 627 | 5.5 | 1 | 16 | 0100111010110010 |
| 628 | −1.5 | −9.5 | 16 | 0100111010110011 |
| 629 | 5.5 | 2.5 | 16 | 0100111010110100 |
| 630 | −3 | −5.5 | 16 | 0100111010110101 |
| 631 | 6 | −3.5 | 16 | 0100111010110110 |
| 632 | 6 | −2.5 | 16 | 0100111010110111 |
| 633 | −5.5 | 5.5 | 16 | 0100111010111000 |
| 634 | 3 | 5 | 16 | 0100111010111001 |
| 635 | −5.5 | 6.5 | 16 | 0100111010111010 |
| 636 | −4 | 4 | 16 | 0100111010111011 |
| 637 | 6.5 | −3.5 | 16 | 0100111010111100 |
| 638 | 6.5 | −2.5 | 16 | 0100111010111101 |
| 639 | 1.5 | 7 | 16 | 0100111010111110 |
| 640 | 3.5 | −5 | 16 | 0100111010111111 |
| 641 | −5 | −3.5 | 16 | 0100111100000000 |
| 642 | 1.5 | 10.5 | 16 | 0100111100000001 |
| 643 | 2 | −6 | 16 | 0100111100000010 |
| 644 | 1 | −15 | 16 | 0100111100000011 |
| 645 | 1 | −9 | 16 | 0100111100000100 |
| 646 | 6.5 | 3.5 | 16 | 0100111100000101 |
| 647 | 1 | −8.5 | 16 | 0100111100000110 |
| 648 | −1.5 | −5 | 16 | 0100111100000111 |
| 649 | −0.5 | 6 | 16 | 0100111100001000 |
| 650 | 7 | 1 | 16 | 0100111100001001 |
| 651 | −3.5 | −5.5 | 16 | 0100111100001010 |
| 652 | 7 | 3 | 16 | 0100111100001011 |
| 653 | −8 | 0.5 | 16 | 0100111100001100 |
| 654 | −7.5 | −2.5 | 16 | 0100111100001101 |
| 655 | −0.5 | 8 | 16 | 0100111100001110 |
| 656 | −6 | 1 | 16 | 0100111100001111 |
| 657 | 0 | 10 | 16 | 0100111100010000 |
| 658 | 7.5 | 1.5 | 16 | 0100111100010001 |
| 659 | 7.5 | 7.5 | 16 | 0100111100010010 |
| 660 | 7.5 | 8.5 | 16 | 0100111100010011 |
| 661 | 0 | 11 | 16 | 0100111100010100 |
| 662 | 8.5 | −15 | 16 | 0100111100010101 |
| 663 | 8.5 | −9.5 | 16 | 0100111100010110 |
| 664 | 8.5 | −4.5 | 16 | 0100111100010111 |
| 665 | −0.5 | 10 | 16 | 0100111100011000 |
| 666 | −15.5 | −1.5 | 16 | 0100111100011001 |
| 667 | −2.5 | 6.5 | 16 | 0100111100011010 |
| 668 | −2 | −5 | 16 | 0100111100011011 |
| 669 | 3.5 | 8.5 | 16 | 0100111100011100 |
| 670 | 3.5 | 11 | 16 | 0100111100011101 |
| 671 | −5.5 | −5.5 | 16 | 0100111100011110 |
| 672 | 2 | 4 | 16 | 0100111100011111 |
| 673 | −4.5 | 5 | 16 | 0100111100100000 |
| 674 | 9.5 | −0.5 | 16 | 0100111100100001 |
| 675 | −15 | −1 | 16 | 0100111100100010 |
| 676 | 4 | −1.5 | 16 | 0100111100100011 |
| 677 | 9.5 | 1 | 16 | 0100111100100100 |
| 678 | 0 | −16 | 16 | 0100111100100101 |
| 679 | 10.5 | −3.5 | 16 | 0100111100100110 |
| 680 | −4 | −4.5 | 16 | 0100111100100111 |
| 681 | −1 | 9.5 | 16 | 0100111100101000 |
| 682 | −4 | −4 | 16 | 0100111100101001 |
| 683 | −1 | 13.5 | 16 | 0100111100101010 |
| 684 | −5.5 | −2 | 16 | 0100111100101011 |
| 685 | 4 | 3 | 16 | 0100111100101100 |
| 686 | 12.5 | −1.5 | 16 | 0100111100101101 |
| 687 | 12.5 | −0.5 | 16 | 0100111100101110 |
| 688 | −0.5 | −15 | 16 | 0100111100101111 |
| 689 | 4.5 | −9.5 | 16 | 0100111100110000 |
| 690 | 13 | −0.5 | 16 | 0100111100110001 |
| 691 | 0 | −12 | 16 | 0100111100110010 |
| 692 | −10 | −0.5 | 16 | 0100111100110011 |
| 693 | −14 | 0.5 | 16 | 0100111100110100 |
| 694 | 0 | −10 | 16 | 0100111100110101 |
| 695 | 1 | 6.5 | 16 | 0100111100110110 |
| 696 | 13.5 | 4.5 | 16 | 0100111100110111 |
| 697 | −0.5 | −12.5 | 16 | 0100111100111000 |
| 698 | 0 | −9 | 16 | 0100111100111001 |
| 699 | −9.5 | −1 | 16 | 0100111100111010 |
| 700 | −11.5 | −3.5 | 16 | 0100111100111011 |
| 701 | 1.5 | −7 | 16 | 0100111100111100 |
| 702 | −3 | 5.5 | 16 | 0100111100111101 |
| 703 | 1.5 | −6 | 16 | 0100111100111110 |
| 704 | 2.5 | 5.5 | 16 | 0100111100111111 |
| 705 | 14.5 | 1.5 | 16 | 0100111101000000 |
| 706 | 2.5 | 6 | 16 | 0100111101000001 |
| 707 | 15.5 | −15.5 | 16 | 0100111101000010 |
| 708 | −3 | 8.5 | 16 | 0100111101000011 |
| 709 | ESC | ESC | 7 | 0010001 |

TABLE 2

XY Joint VLC Motion Vector Table for General Video

| Index | Mv_x | Mv_y | Number of bits | Code |
|---|---|---|---|---|
| 0 | 0 | 0 | 1 | 0 |
| 1 | −0.5 | 0 | 5 | 10011 |
| 2 | 0 | −0.5 | 5 | 10101 |
| 3 | 0.5 | 0 | 5 | 11001 |
| 4 | −0.5 | −0.5 | 5 | 11011 |
| 5 | 0 | 0.5 | 6 | 100100 |
| 6 | 0.5 | −0.5 | 6 | 111000 |
| 7 | 0.5 | 0.5 | 6 | 111001 |
| 8 | −0.5 | 0.5 | 6 | 111101 |
| 9 | 1 | 0 | 7 | 1011101 |
| 10 | −1 | 0 | 7 | 1101000 |
| 11 | 0 | −1 | 7 | 1110110 |
| 12 | 0 | 1 | 8 | 10010111 |
| 13 | 1 | −0.5 | 8 | 10111101 |
| 14 | −1 | −0.5 | 8 | 11000111 |
| 15 | 1.5 | 0 | 8 | 11010110 |
| 16 | −1 | 0.5 | 8 | 11101010 |

TABLE 2-continued

XY Joint VLC Motion Vector Table for General Video

| Index | Mv_x | Mv_y | Number of bits | Code |
|---|---|---|---|---|
| 17 | −0.5 | −1 | 8 | 11101110 |
| 18 | 0.5 | −1 | 8 | 11110000 |
| 19 | −1.5 | 0 | 8 | 11110001 |
| 20 | 1 | 0.5 | 8 | 11111010 |
| 21 | 0 | −1.5 | 9 | 100101010 |
| 22 | 0.5 | 1 | 9 | 100101100 |
| 23 | −0.5 | 1 | 9 | 101000000 |
| 24 | −1 | −1 | 9 | 101001000 |
| 25 | 0 | 1.5 | 9 | 101100010 |
| 26 | 1 | −1 | 9 | 101101001 |
| 27 | −0.5 | −1.5 | 9 | 101111100 |
| 28 | −1.5 | −0.5 | 9 | 101111110 |
| 29 | 2 | 0 | 9 | 110000001 |
| 30 | 1.5 | −0.5 | 9 | 110000011 |
| 31 | −1 | 1 | 9 | 110001010 |
| 32 | 0.5 | −1.5 | 9 | 110001100 |
| 33 | −2 | 0 | 9 | 110001101 |
| 34 | 1 | 1 | 9 | 110100110 |
| 35 | 0 | −2 | 9 | 110101001 |
| 36 | 1.5 | 0.5 | 9 | 111100110 |
| 37 | −1.5 | 0.5 | 9 | 111110000 |
| 38 | −0.5 | 1.5 | 9 | 111110110 |
| 39 | 0.5 | 1.5 | 10 | 1001010011 |
| 40 | 0 | 2 | 10 | 1010001010 |
| 41 | −2.5 | 0 | 10 | 1010010011 |
| 42 | 0 | −2.5 | 10 | 1010010111 |
| 43 | 2.5 | 0 | 10 | 1010011100 |
| 44 | 0 | −3.5 | 10 | 1011010100 |
| 45 | 0 | 2.5 | 10 | 1011010111 |
| 46 | −2 | −0.5 | 10 | 1011100000 |
| 47 | 2 | −0.5 | 10 | 1011100111 |
| 48 | −1 | −1.5 | 10 | 1011111111 |
| 49 | 3 | 0 | 10 | 1100000000 |
| 50 | −1.5 | −1 | 10 | 1100001010 |
| 51 | −0.5 | −2 | 10 | 1100001100 |
| 52 | 0 | 3.5 | 10 | 1100001110 |
| 53 | 0 | −3 | 10 | 1100010000 |
| 54 | 1.5 | −1 | 10 | 1100010011 |
| 55 | −3 | 0 | 10 | 1101001011 |
| 56 | −1 | −2 | 10 | 1101010000 |
| 57 | 0 | 3 | 10 | 1101011100 |
| 58 | 0.5 | −2 | 10 | 1101011111 |
| 59 | −2.5 | −0.5 | 10 | 1110100110 |
| 60 | −2 | 0.5 | 10 | 1110101100 |
| 61 | 1 | −1.5 | 10 | 1110101110 |
| 62 | −2 | −1 | 10 | 1110101111 |
| 63 | 2 | 0.5 | 10 | 1110111101 |
| 64 | −1.5 | 1 | 10 | 1110111111 |
| 65 | −0.5 | −2.5 | 10 | 1111100100 |
| 66 | 2 | −1 | 10 | 1111100110 |
| 67 | −3.5 | 0 | 10 | 1111101111 |
| 68 | −0.5 | 2 | 10 | 1111110010 |
| 69 | 3.5 | 0 | 10 | 1111110100 |
| 70 | 1 | −2 | 10 | 1111110111 |
| 71 | 1.5 | 1 | 10 | 1111111011 |
| 72 | −2.5 | 0.5 | 10 | 1111111110 |
| 73 | −1.5 | −1.5 | 11 | 10010100100 |
| 74 | −6.5 | 0 | 11 | 10010110101 |
| 75 | 0.5 | −2.5 | 11 | 10010110111 |
| 76 | −0.5 | −3.5 | 11 | 10100001000 |
| 77 | 1.5 | −1.5 | 11 | 10100001100 |
| 78 | −0.5 | 2.5 | 11 | 10100001101 |
| 79 | 2.5 | −0.5 | 11 | 10100010001 |
| 80 | 6.5 | 0 | 11 | 10100010111 |
| 81 | 2.5 | 0.5 | 11 | 10100011001 |
| 82 | 0.5 | 2.5 | 11 | 10100100101 |
| 83 | −1 | 1.5 | 11 | 10100101010 |
| 84 | −2 | 1 | 11 | 10100101100 |
| 85 | 0 | −6.5 | 11 | 10100110000 |
| 86 | 0 | −4 | 11 | 10100110110 |
| 87 | 1.5 | 1.5 | 11 | 10100111101 |
| 88 | 1 | 1.5 | 11 | 10100111110 |
| 89 | −3.5 | −0.5 | 11 | 10100111111 |
| 90 | −1.5 | 1.5 | 11 | 10110000101 |
| 91 | −3.5 | 0.5 | 11 | 10110000110 |
| 92 | 0.5 | −3.5 | 11 | 10110000111 |
| 93 | 0.5 | 2 | 11 | 10110001101 |
| 94 | −5.5 | 0 | 11 | 10110010111 |
| 95 | 5.5 | 0 | 11 | 10110011001 |
| 96 | −0.5 | 3.5 | 11 | 10110100000 |
| 97 | −4 | 0 | 11 | 10110100001 |
| 98 | −1 | 2 | 11 | 10110101011 |
| 99 | 3 | −0.5 | 11 | 10110110101 |
| 100 | −3 | −0.5 | 11 | 10110111000 |
| 101 | −0.5 | −3 | 11 | 10110111010 |
| 102 | 2 | 1 | 11 | 10110111011 |
| 103 | 3.5 | 0.5 | 11 | 10110111100 |
| 104 | −9.5 | 0 | 11 | 10110111110 |
| 105 | 3 | −1 | 11 | 10111000010 |
| 106 | 3 | 0.5 | 11 | 10111001000 |
| 107 | 0.5 | 3.5 | 11 | 10111001100 |
| 108 | −14.5 | 0 | 11 | 10111001101 |
| 109 | 9.5 | 0 | 11 | 10111100100 |
| 110 | 4 | 0 | 11 | 10111100110 |
| 111 | 9 | 0 | 11 | 10111110101 |
| 112 | −0.5 | 3 | 11 | 11000000010 |
| 113 | 3.5 | −0.5 | 11 | 11000001010 |
| 114 | 5 | 0 | 11 | 11000010000 |
| 115 | 6 | 0 | 11 | 11000010001 |
| 116 | 4.5 | 0 | 11 | 11000010011 |
| 117 | 0 | −9.5 | 11 | 11000100010 |
| 118 | −3 | −1 | 11 | 11000100100 |
| 119 | −4.5 | 0 | 11 | 11000100101 |
| 120 | −6 | 0 | 11 | 11000101110 |
| 121 | −1 | −3 | 11 | 11010100010 |
| 122 | 14.5 | 0 | 11 | 11010101001 |
| 123 | −15.5 | 0 | 11 | 11010101011 |
| 124 | 0 | −4.5 | 11 | 11010101110 |
| 125 | 0 | 6.5 | 11 | 11010101111 |
| 126 | −5 | 0 | 11 | 11101000010 |
| 127 | 0 | −14.5 | 11 | 11101000101 |
| 128 | 1 | 2 | 11 | 11101000110 |
| 129 | 8.5 | 0 | 11 | 11101001001 |
| 130 | −3.5 | −1.5 | 11 | 11101001010 |
| 131 | 3 | 1 | 11 | 11101001011 |
| 132 | −11.5 | 0 | 11 | 11101001111 |
| 133 | 0 | 5.5 | 11 | 11101111100 |
| 134 | −2 | −1.5 | 11 | 11110010001 |
| 135 | 0.5 | −3 | 11 | 11110010011 |
| 136 | −2 | −2 | 11 | 11110010100 |
| 137 | 0 | −15.5 | 11 | 11110010101 |
| 138 | −15 | 0 | 11 | 11110010110 |
| 139 | 0 | −6 | 11 | 11110010111 |
| 140 | −8.5 | 0 | 11 | 11110011101 |
| 141 | −9 | 0 | 11 | 11110011110 |
| 142 | −3 | 0.5 | 11 | 11110011111 |
| 143 | 15.5 | 0 | 11 | 11111000101 |
| 144 | 0 | 4 | 11 | 11111000111 |
| 145 | 11.5 | 0 | 11 | 11111001111 |
| 146 | −3.5 | 1.5 | 11 | 11111011101 |
| 147 | 0.5 | 3 | 11 | 11111100001 |
| 148 | −7 | 0 | 11 | 11111100011 |
| 149 | 2.5 | −1 | 11 | 11111100111 |
| 150 | −6.5 | −0.5 | 11 | 11111101010 |
| 151 | 0 | −5.5 | 11 | 11111101100 |
| 152 | −2.5 | −1 | 11 | 11111110000 |
| 153 | 0 | −5 | 11 | 11111110010 |
| 154 | −1 | 3 | 11 | 11111110100 |
| 155 | −3 | 1 | 11 | 11111111010 |
| 156 | 0 | 6 | 12 | 100101000001 |
| 157 | 2.5 | −1.5 | 12 | 100101000110 |
| 158 | 0 | −9 | 12 | 100101001010 |
| 159 | −0.5 | −6.5 | 12 | 100101011001 |
| 160 | 2 | −2 | 12 | 100101011010 |
| 161 | −1.5 | −2 | 12 | 100101011111 |
| 162 | 0 | 4.5 | 12 | 100101101000 |
| 163 | −4 | −0.5 | 12 | 100101101001 |
| 164 | −3.5 | 1 | 12 | 100101101101 |
| 165 | −4 | −1 | 12 | 101000001010 |
| 166 | 0 | 5 | 12 | 101000001101 |

TABLE 2-continued

XY Joint VLC Motion Vector Table for General Video

| Index | Mv_x | Mv_y | Number of bits | Code |
|---|---|---|---|---|
| 167 | −6.5 | 0.5 | 12 | 101000010010 |
| 168 | 1 | −3 | 12 | 101000010101 |
| 169 | −1 | −4 | 12 | 101000011100 |
| 170 | −16 | 0 | 12 | 101000011110 |
| 171 | −1 | −2.5 | 12 | 101000011111 |
| 172 | −3.5 | −1 | 12 | 101000100101 |
| 173 | 1.5 | −2 | 12 | 101000100111 |
| 174 | 2 | −1.5 | 12 | 101000101100 |
| 175 | 3.5 | −1.5 | 12 | 101000110110 |
| 176 | −0.5 | −4 | 12 | 101000110111 |
| 177 | −4 | 1 | 12 | 101000111000 |
| 178 | 0 | −11.5 | 12 | 101000111010 |
| 179 | 0 | 9.5 | 12 | 101000111100 |
| 180 | 3.5 | 1.5 | 12 | 101000111101 |
| 181 | 0 | 8.5 | 12 | 101001010000 |
| 182 | −9.5 | −0.5 | 12 | 101001010011 |
| 183 | −4 | 0.5 | 12 | 101001011011 |
| 184 | −10 | 0 | 12 | 101001100010 |
| 185 | −2.5 | 1.5 | 12 | 101001100100 |
| 186 | −4.5 | 0.5 | 12 | 101001101010 |
| 187 | 6.5 | −0.5 | 12 | 101001110111 |
| 188 | −5.5 | 0.5 | 12 | 101001111000 |
| 189 | 4.5 | 0.5 | 12 | 101100000001 |
| 190 | 0.5 | −4 | 12 | 101100000100 |
| 191 | 3 | −1.5 | 12 | 101100000101 |
| 192 | −2.5 | −1.5 | 12 | 101100000110 |
| 193 | −2 | 1.5 | 12 | 101100001000 |
| 194 | 2.5 | 1 | 12 | 101100011001 |
| 195 | 6.5 | 0.5 | 12 | 101100011101 |
| 196 | −5.5 | −0.5 | 12 | 101100011110 |
| 197 | −2.5 | 1 | 12 | 101100011111 |
| 198 | 1 | 3 | 12 | 101100100001 |
| 199 | 0 | −8.5 | 12 | 101100100010 |
| 200 | 0.5 | −6.5 | 12 | 101100100011 |
| 201 | −7.5 | 0 | 12 | 101100100100 |
| 202 | 3 | −2 | 12 | 101100100101 |
| 203 | −10.5 | 0 | 12 | 101100101000 |
| 204 | 6 | −0.5 | 12 | 101100101010 |
| 205 | 5.5 | −0.5 | 12 | 101100101101 |
| 206 | 3.5 | −1 | 12 | 101100110100 |
| 207 | −4.5 | −0.5 | 12 | 101100110110 |
| 208 | 2 | 2 | 12 | 101100111001 |
| 209 | 0 | −15 | 12 | 101100111010 |
| 210 | 1 | −2.5 | 12 | 101100111100 |
| 211 | 0 | −7 | 12 | 101100111101 |
| 212 | 2.5 | 1.5 | 12 | 101100111110 |
| 213 | 0 | 9 | 12 | 101100111111 |
| 214 | 11 | 0 | 12 | 101101000101 |
| 215 | −1 | 2.5 | 12 | 101101000110 |
| 216 | −14.5 | −0.5 | 12 | 101101000111 |
| 217 | 4 | −1 | 12 | 101101010101 |
| 218 | 0.5 | −4.5 | 12 | 101101011001 |
| 219 | −9.5 | 0.5 | 12 | 101101011010 |
| 220 | 10.5 | 0 | 12 | 101101011011 |
| 221 | 5.5 | 0.5 | 12 | 101101100010 |
| 222 | 9.5 | −0.5 | 12 | 101101100011 |
| 223 | 0 | 14.5 | 12 | 101101100101 |
| 224 | 4.5 | −0.5 | 12 | 101101101000 |
| 225 | 3.5 | 1 | 12 | 101101101100 |
| 226 | 7.5 | 0 | 12 | 101101101110 |
| 227 | −0.5 | −9.5 | 12 | 101101101111 |
| 228 | −8 | 0 | 12 | 101101110011 |
| 229 | 2 | 1.5 | 12 | 101101111011 |
| 230 | −1.5 | −2.5 | 12 | 101110000110 |
| 231 | −2 | 2 | 12 | 101110000111 |
| 232 | 4 | −0.5 | 12 | 101110001011 |
| 233 | 1 | −4 | 12 | 101110001110 |
| 234 | 15 | 0 | 12 | 101110001111 |
| 235 | −0.5 | 5.5 | 12 | 101110010010 |
| 236 | −12 | 0 | 12 | 101110010011 |
| 237 | 1.5 | 2 | 12 | 101110010100 |
| 238 | 8 | 0 | 12 | 101110010111 |
| 239 | −0.5 | −4.5 | 12 | 101111000010 |
| 240 | −11 | 0 | 12 | 101111000100 |
| 241 | 0 | −16 | 12 | 101111000101 |
| 242 | 4 | 0.5 | 12 | 101111000110 |
| 243 | −14.5 | 0.5 | 12 | 101111000111 |
| 244 | −1 | −3.5 | 12 | 101111001011 |
| 245 | −0.5 | −5.5 | 12 | 101111001110 |
| 246 | 0 | −7.5 | 12 | 101111001111 |
| 247 | 7 | 0 | 12 | 101111101000 |
| 248 | 5 | −1 | 12 | 101111101100 |
| 249 | 1.5 | −2.5 | 12 | 101111101101 |
| 250 | 14 | 0 | 12 | 101111101110 |
| 251 | −3 | −2 | 12 | 101111111000 |
| 252 | −11.5 | −0.5 | 12 | 101111111001 |
| 253 | 0 | −10 | 12 | 101111111011 |
| 254 | 0 | 11.5 | 12 | 110000000110 |
| 255 | −7 | −0.5 | 12 | 110000010010 |
| 256 | −0.5 | 6.5 | 12 | 110000010011 |
| 257 | −15.5 | 15.5 | 12 | 110000100100 |
| 258 | 13.5 | 0 | 12 | 110000100101 |
| 259 | −15.5 | −0.5 | 12 | 110000101101 |
| 260 | −0.5 | 4.5 | 12 | 110000101110 |
| 261 | 5 | −0.5 | 12 | 110000110101 |
| 262 | −5 | −0.5 | 12 | 110000110101 |
| 263 | 0.5 | 5.5 | 12 | 110000110110 |
| 264 | −14 | 0 | 12 | 110000110111 |
| 265 | 0 | −11 | 12 | 110000111100 |
| 266 | 0.5 | −5.5 | 12 | 110001000110 |
| 267 | −5 | 1 | 12 | 110001000110 |
| 268 | −6 | −0.5 | 12 | 110001000111 |
| 269 | 8.5 | −0.5 | 12 | 110001011000 |
| 270 | −1.5 | 2 | 12 | 110001011001 |
| 271 | 1 | −3.5 | 12 | 110001011010 |
| 272 | −1.5 | 2.5 | 12 | 110001011111 |
| 273 | 15.5 | −0.5 | 12 | 110100100010 |
| 274 | −0.5 | −14.5 | 12 | 110100100011 |
| 275 | 14.5 | −0.5 | 12 | 110100100101 |
| 276 | −15.5 | −15.5 | 12 | 110100101010 |
| 277 | 0.5 | 6.5 | 12 | 110100101011 |
| 278 | 1 | 2.5 | 12 | 110100111000 |
| 279 | −13.5 | 0 | 12 | 110100111100 |
| 280 | −4 | −1.5 | 12 | 110100111101 |
| 281 | 15.5 | −15.5 | 12 | 110100111110 |
| 282 | 0 | −8 | 12 | 110100111111 |
| 283 | 4 | 1 | 12 | 110101000111 |
| 284 | 0 | 15.5 | 12 | 110101010000 |
| 285 | 3 | 1.5 | 12 | 110101010101 |
| 286 | −5 | 0.5 | 12 | 110101011011 |
| 287 | −5 | −1 | 12 | 110101011100 |
| 288 | 1.5 | 2.5 | 12 | 110101011101 |
| 289 | −2 | −3 | 12 | 110101110100 |
| 290 | −15.5 | 0.5 | 12 | 110101110110 |
| 291 | −3 | −1.5 | 12 | 110101110111 |
| 292 | 0 | −14 | 12 | 110101111000 |
| 293 | −8.5 | −0.5 | 12 | 110101111010 |
| 294 | −0.5 | 4 | 12 | 110101111011 |
| 295 | 9.5 | 0.5 | 12 | 111010000010 |
| 296 | 2.5 | −2 | 12 | 111010000111 |
| 297 | 14.5 | 0.5 | 12 | 111010001000 |
| 298 | −0.5 | −6 | 12 | 111010001110 |
| 299 | 0.5 | 4.5 | 12 | 111010001111 |
| 300 | −0.5 | −15.5 | 12 | 111010010000 |
| 301 | 0 | −12 | 12 | 111010010001 |
| 302 | 11.5 | −0.5 | 12 | 111010011100 |
| 303 | 10 | 0 | 12 | 111010110110 |
| 304 | −4 | −2 | 12 | 111010110111 |
| 305 | −15 | −0.5 | 12 | 111011110010 |
| 306 | −0.5 | −11.5 | 12 | 111011111010 |
| 307 | −1.5 | −3.5 | 12 | 111011111011 |
| 308 | 1.5 | 3.5 | 12 | 111100100001 |
| 309 | 0 | 8 | 12 | 111100100101 |
| 310 | 9 | −0.5 | 12 | 111100111000 |
| 311 | −0.5 | 6 | 12 | 111100111001 |
| 312 | −0.5 | 8.5 | 12 | 111110010100 |
| 313 | −12.5 | 0 | 12 | 111110010101 |
| 314 | 2 | −3 | 12 | 111110010111 |
| 315 | 8.5 | 0.5 | 12 | 111110011100 |
| 316 | −8.5 | 0.5 | 12 | 111110011101 |

TABLE 2-continued

XY Joint VLC Motion Vector Table for General Video

| Index | Mv_x | Mv_y | Number of bits | Code |
|---|---|---|---|---|
| 317 | 1.5 | −3.5 | 12 | 111110111001 |
| 318 | 0.5 | −9.5 | 12 | 111111000000 |
| 319 | −2 | 3 | 12 | 111111000001 |
| 320 | 0 | 10.5 | 12 | 111111000100 |
| 321 | −1 | 3.5 | 12 | 111111000101 |
| 322 | 0 | 7.5 | 12 | 111111001101 |
| 323 | −3.5 | −2 | 12 | 111111010110 |
| 324 | 6 | −1 | 12 | 111111010111 |
| 325 | −0.5 | 9.5 | 12 | 111111011011 |
| 326 | −1.5 | 3.5 | 12 | 111111100111 |
| 327 | 0 | 13.5 | 12 | 111111101010 |
| 328 | −0.5 | 14.5 | 12 | 111111101011 |
| 329 | −2.5 | −2.5 | 12 | 111111110000 |
| 330 | 1 | 4 | 12 | 111111110001 |
| 331 | 0.5 | −5 | 12 | 111111110010 |
| 332 | −2.5 | −2 | 12 | 111111110011 |
| 333 | −6 | 0.5 | 12 | 111111111100 |
| 334 | 0.5 | 4 | 12 | 111111111101 |
| 335 | 5 | 0.5 | 12 | 111111111110 |
| 336 | 15.5 | 0.5 | 12 | 111111111111 |
| 337 | 15.5 | 15.5 | 13 | 1001010000000 |
| 338 | −3.5 | −3.5 | 13 | 1001010000001 |
| 339 | 1 | −5 | 13 | 1001010000100 |
| 340 | 3 | 2 | 13 | 1001010000111 |
| 341 | −2 | −2.5 | 13 | 1001010001000 |
| 342 | −1 | 4 | 13 | 1001010001001 |
| 343 | 0 | −10.5 | 13 | 1001010001010 |
| 344 | −3 | 1.5 | 13 | 1001010001011 |
| 345 | −11.5 | 0.5 | 13 | 1001010001111 |
| 346 | −0.5 | −5 | 13 | 1001010010111 |
| 347 | −1 | −5 | 13 | 1001010110111 |
| 348 | 0.5 | 8.5 | 13 | 1001010111000 |
| 349 | −10 | −0.5 | 13 | 1001010111010 |
| 350 | −12 | −0.5 | 13 | 1001010111011 |
| 351 | 0.5 | −14.5 | 13 | 1001010111100 |
| 352 | 2.5 | −2.5 | 13 | 1001010111101 |
| 353 | −7 | −1 | 13 | 1010000010000 |
| 354 | −4.5 | 1.5 | 13 | 1010000010011 |
| 355 | 12.5 | 0 | 13 | 1010000010111 |
| 356 | −0.5 | 5 | 13 | 1010000011000 |
| 357 | 0.5 | −6 | 13 | 1010000011001 |
| 358 | 2.5 | 2.5 | 13 | 1010000011111 |
| 359 | 3 | 3 | 13 | 1010000100110 |
| 360 | 0 | 11 | 13 | 1010000101000 |
| 361 | 0 | −13.5 | 13 | 1010000101101 |
| 362 | −3 | −3 | 13 | 1010000101110 |
| 363 | 11.5 | 0.5 | 13 | 1010000101111 |
| 364 | −9 | −0.5 | 13 | 1010000111010 |
| 365 | −4 | 1.5 | 13 | 1010000111011 |
| 366 | 2 | 3 | 13 | 1010001000011 |
| 367 | 4 | −2 | 13 | 1010001001000 |
| 368 | −2 | −4 | 13 | 1010001001001 |
| 369 | 0 | 14 | 13 | 1010001001100 |
| 370 | 2.5 | 2 | 13 | 1010001001110 |
| 371 | −1.5 | −3 | 13 | 1010001101000 |
| 372 | 0.5 | 9.5 | 13 | 1010001101001 |
| 373 | −4.5 | −1.5 | 13 | 1010001101011 |
| 374 | 4.5 | −1 | 13 | 1010001110010 |
| 375 | 1.5 | −3 | 13 | 1010001110111 |
| 376 | −15 | −1 | 13 | 1010001111100 |
| 377 | −0.5 | −8.5 | 13 | 1010010010010 |
| 378 | −0.5 | 11.5 | 13 | 1010010010011 |
| 379 | 0.5 | −15.5 | 13 | 1010010100011 |
| 380 | −4.5 | −1 | 13 | 1010010101100 |
| 381 | 6 | 0.5 | 13 | 1010010110101 |
| 382 | 0 | 7 | 13 | 1010011000110 |
| 383 | 5 | 1 | 13 | 1010011001101 |
| 384 | 10.5 | −0.5 | 13 | 1010011010000 |
| 385 | −2.5 | 2.5 | 13 | 1010011010001 |
| 386 | −4.5 | 1 | 13 | 1010011010010 |
| 387 | 1 | 3.5 | 13 | 1010011010011 |
| 388 | 3 | −3 | 13 | 1010011010110 |
| 389 | 5.5 | −1 | 13 | 1010011011111 |
| 390 | 8 | −0.5 | 13 | 1010011101000 |
| 391 | −10.5 | −0.5 | 13 | 1010011101001 |
| 392 | 3.5 | 2.5 | 13 | 1010011101010 |
| 393 | 4.5 | −1.5 | 13 | 1010011101011 |
| 394 | 3.5 | −2 | 13 | 1011000000000 |
| 395 | −16 | −1 | 13 | 1011000000100 |
| 396 | −7.5 | −0.5 | 13 | 1011000000101 |
| 397 | −10.5 | 0.5 | 13 | 1011000000110 |
| 398 | −0.5 | −7 | 13 | 1011000000111 |
| 399 | 2 | −4 | 13 | 1011000001110 |
| 400 | −6 | −1 | 13 | 1011000001111 |
| 401 | −2.5 | 2 | 13 | 1011000010010 |
| 402 | 0.5 | 14.5 | 13 | 1011000010011 |
| 403 | −16 | −0.5 | 13 | 1011000110000 |
| 404 | −3 | 2 | 13 | 1011000110001 |
| 405 | 12 | 0 | 13 | 1011000111000 |
| 406 | −3.5 | 2.5 | 13 | 1011000111001 |
| 407 | 1.5 | 4.5 | 13 | 1011001000000 |
| 408 | 2 | −2.5 | 13 | 1011001000001 |
| 409 | 0.5 | −11.5 | 13 | 1011001001100 |
| 410 | 15 | −0.5 | 13 | 1011001001101 |
| 411 | −3.5 | −2.5 | 13 | 1011001001110 |
| 412 | −5.5 | −1 | 13 | 1011001001111 |
| 413 | −1 | 5 | 13 | 1011001010010 |
| 414 | 0 | −12.5 | 13 | 1011001010011 |
| 415 | 0.5 | 11.5 | 13 | 1011001010110 |
| 416 | 2 | 2.5 | 13 | 1011001010111 |
| 417 | −1 | −6 | 13 | 1011001011000 |
| 418 | 1.5 | 3 | 13 | 1011001011001 |
| 419 | −11 | −0.5 | 13 | 1011001100000 |
| 420 | 13 | 0 | 13 | 1011001100001 |
| 421 | −5.5 | 1.5 | 13 | 1011001100010 |
| 422 | −6 | 1 | 13 | 1011001100011 |
| 423 | −0.5 | −15 | 13 | 1011001101010 |
| 424 | −3.5 | 3.5 | 13 | 1011001101011 |
| 425 | −0.5 | −16 | 13 | 1011001101110 |
| 426 | 4.5 | 1 | 13 | 1011001101111 |
| 427 | −7.5 | 0.5 | 13 | 1011001110000 |
| 428 | −0.5 | −9 | 13 | 1011001110001 |
| 429 | −10 | −1 | 13 | 1011001110110 |
| 430 | 3 | −4 | 13 | 1011001110111 |
| 431 | 4 | −1.5 | 13 | 1011010001000 |
| 432 | −1 | −7 | 13 | 1011010001001 |
| 433 | 0.5 | 6 | 13 | 1011010101000 |
| 434 | −13 | 0 | 13 | 1011010101001 |
| 435 | 11 | −0.5 | 13 | 1011010110000 |
| 436 | 1 | −6 | 13 | 1011010110001 |
| 437 | 14 | −0.5 | 13 | 1011011000000 |
| 438 | 3.5 | 3.5 | 13 | 1011011000001 |
| 439 | −0.5 | −7.5 | 13 | 1011011000010 |
| 440 | −14.5 | −14.5 | 13 | 1011011000011 |
| 441 | −0.5 | 9 | 13 | 1011011001000 |
| 442 | −7 | 0.5 | 13 | 1011011001001 |
| 443 | 3.5 | −3.5 | 13 | 1011011001100 |
| 444 | −15.5 | −1.5 | 13 | 1011011001101 |
| 445 | −1 | −4.5 | 13 | 1011011001110 |
| 446 | −1.5 | 3 | 13 | 1011011001111 |
| 447 | −4 | 3 | 13 | 1011011010010 |
| 448 | −2 | 2.5 | 13 | 1011011010011 |
| 449 | 7.5 | −0.5 | 13 | 1011011011010 |
| 450 | 3 | −2.5 | 13 | 1011011011011 |
| 451 | −2.5 | −3.5 | 13 | 1011011100100 |
| 452 | 0.5 | 5 | 13 | 1011011100101 |
| 453 | 7 | −0.5 | 13 | 1011011110100 |
| 454 | −15 | 0.5 | 13 | 1011011110101 |
| 455 | −14 | −0.5 | 13 | 1011011111100 |
| 456 | 7.5 | 0.5 | 13 | 1011011111101 |
| 457 | 4.5 | 1.5 | 13 | 1011011111110 |
| 458 | −3 | 3 | 13 | 1011011111111 |
| 459 | −3 | −2.5 | 13 | 1011100010000 |
| 460 | −1.5 | −4.5 | 13 | 1011100010001 |
| 461 | −5.5 | 1 | 13 | 1011100010010 |
| 462 | −4 | 2 | 13 | 1011100010011 |
| 463 | 1 | −4.5 | 13 | 1011100010100 |
| 464 | −14.5 | 14.5 | 13 | 1011100010101 |
| 465 | −2 | 4 | 13 | 1011100011000 |
| 466 | −12 | −1 | 13 | 1011100011001 |

TABLE 2-continued

XY Joint VLC Motion Vector Table for General Video

| Index | Mv_x | Mv_y | Number of bits | Code |
|---|---|---|---|---|
| 467 | −0.5 | 15.5 | 13 | 1011100011010 |
| 468 | −4 | −3 | 13 | 1011100011011 |
| 469 | 2.5 | −3 | 13 | 1011100101010 |
| 470 | 14.5 | −14.5 | 13 | 1011100101011 |
| 471 | −8 | −0.5 | 13 | 1011100101100 |
| 472 | 9 | −1 | 13 | 1011100101101 |
| 473 | 0 | 10 | 13 | 1011110000000 |
| 474 | 1 | 5 | 13 | 1011110000001 |
| 475 | 1.5 | −4 | 13 | 1011110000010 |
| 476 | −0.5 | −10 | 13 | 1011110000011 |
| 477 | 0 | 15 | 13 | 1011110000110 |
| 478 | −1 | −5.5 | 13 | 1011110000111 |
| 479 | 5 | −2 | 13 | 1011110010100 |
| 480 | 1.5 | −4.5 | 13 | 1011110010101 |
| 481 | −2 | −3.5 | 13 | 1011111010010 |
| 482 | 3 | −3.5 | 13 | 1011111010011 |
| 483 | −1.5 | 4.5 | 13 | 1011111011110 |
| 484 | 3.5 | −2.5 | 13 | 1011111011111 |
| 485 | −5 | −1.5 | 13 | 1011111110100 |
| 486 | −1 | 4.5 | 13 | 1011111110101 |
| 487 | −1 | 6 | 13 | 1100000001110 |
| 488 | 13.5 | −0.5 | 13 | 1100000001111 |
| 489 | −5 | −2 | 13 | 1100000100000 |
| 490 | 9 | 0.5 | 13 | 1100000100001 |
| 491 | −11 | −1 | 13 | 1100000100010 |
| 492 | 1 | 4.5 | 13 | 1100000100011 |
| 493 | −0.5 | 10.5 | 13 | 1100000101100 |
| 494 | −5.5 | −1.5 | 13 | 1100000101101 |
| 495 | 14 | −1 | 13 | 1100000101110 |
| 496 | −9 | −1 | 13 | 1100000101111 |
| 497 | −4 | −4 | 13 | 1100001011000 |
| 498 | 2.5 | −3.5 | 13 | 1100001011001 |
| 499 | 0.5 | 10.5 | 13 | 1100001101000 |
| 500 | 2.5 | 3.5 | 13 | 1100001101001 |
| 501 | 15.5 | −1.5 | 13 | 1100001111010 |
| 502 | 5.5 | −1.5 | 13 | 1100001111011 |
| 503 | 4 | 1.5 | 13 | 1100001111110 |
| 504 | 13.5 | 0.5 | 13 | 1100001111111 |
| 505 | 5.5 | 1 | 13 | 1100010110110 |
| 506 | −3.5 | 2 | 13 | 1100010110111 |
| 507 | 3.5 | 2 | 13 | 1100010111100 |
| 508 | −1.5 | −4 | 13 | 1100010111101 |
| 509 | 10.5 | 0.5 | 13 | 1101001000000 |
| 510 | −1.5 | 4 | 13 | 1101001000001 |
| 511 | 1 | −5.5 | 13 | 1101001000010 |
| 512 | −0.5 | 13.5 | 13 | 1101001000011 |
| 513 | 0.5 | −8.5 | 13 | 1101001001000 |
| 514 | −0.5 | 11 | 13 | 1101001001001 |
| 515 | 8 | 0.5 | 13 | 1101001001100 |
| 516 | −0.5 | −12 | 13 | 1101001001101 |
| 517 | −0.5 | 8 | 13 | 1101001001110 |
| 518 | −8 | 0.5 | 13 | 1101001001111 |
| 519 | −0.5 | −10.5 | 13 | 1101001010000 |
| 520 | 10 | −0.5 | 13 | 1101001010001 |
| 521 | −15.5 | 1.5 | 13 | 1101001010010 |
| 522 | −13.5 | 0.5 | 13 | 1101001010011 |
| 523 | −9.5 | −3.5 | 13 | 1101001110010 |
| 524 | 0 | 12.5 | 13 | 1101001110011 |
| 525 | −0.5 | 7.5 | 13 | 1101001110100 |
| 526 | 14.5 | 14.5 | 13 | 1101001110101 |
| 527 | 0.5 | −7.5 | 13 | 1101001110110 |
| 528 | 0.5 | −7 | 13 | 1101001110111 |
| 529 | −0.5 | −13.5 | 13 | 1101010001100 |
| 530 | −4 | −3.5 | 13 | 1101010001101 |
| 531 | −1.5 | −15.5 | 13 | 1101010100010 |
| 532 | 1 | −7 | 13 | 1101010100011 |
| 533 | −1 | −15 | 13 | 1101010101000 |
| 534 | −1.5 | −5.5 | 13 | 1101010101001 |
| 535 | 12.5 | −15.5 | 13 | 1101010110100 |
| 536 | 5 | −1.5 | 13 | 1101010110101 |
| 537 | 8 | −1 | 13 | 1101011101010 |
| 538 | −3.5 | −3 | 13 | 1101011101011 |
| 539 | −6.5 | −1 | 13 | 1101011110010 |
| 540 | 2.5 | 3 | 13 | 1101011110011 |
| 541 | −3 | −3.5 | 13 | 1110100000000 |
| 542 | −13.5 | −0.5 | 13 | 1110100000001 |
| 543 | 0.5 | −10.5 | 13 | 1110100000010 |
| 544 | −8 | −1 | 13 | 1110100000011 |
| 545 | −3 | −4 | 13 | 1110100000110 |
| 546 | −6.5 | 3.5 | 13 | 1110100000111 |
| 547 | −16 | 0.5 | 13 | 1110100001100 |
| 548 | −1 | 5.5 | 13 | 1110100001101 |
| 549 | 15.5 | 1.5 | 13 | 1110100010010 |
| 550 | 0.5 | 13.5 | 13 | 1110100010011 |
| 551 | 3.5 | 3 | 13 | 1110100111010 |
| 552 | 2 | −3.5 | 13 | 1110100111011 |
| 553 | −2.5 | −3 | 13 | 1110101101000 |
| 554 | 3 | 2.5 | 13 | 1110101101001 |
| 555 | −16 | 1 | 13 | 1110101101010 |
| 556 | 15 | −1 | 13 | 1110101101011 |
| 557 | 4 | 2 | 13 | 1110111100000 |
| 558 | 10 | −1 | 13 | 1110111100001 |
| 559 | −2.5 | 3.5 | 13 | 1110111100010 |
| 560 | −1 | −10 | 13 | 1110111100011 |
| 561 | 0.5 | 15.5 | 13 | 1110111100110 |
| 562 | −9 | 0.5 | 13 | 1110111100111 |
| 563 | 11 | −1 | 13 | 1111001000000 |
| 564 | −3.5 | −9.5 | 13 | 1111001000001 |
| 565 | −0.5 | −11 | 13 | 1111001001000 |
| 566 | 3 | 4 | 13 | 1111001001001 |
| 567 | 7 | 0.5 | 13 | 1111001110010 |
| 568 | −10 | 0.5 | 13 | 1111001110011 |
| 569 | −3 | 2.5 | 13 | 1111100010000 |
| 570 | 7 | −1 | 13 | 1111100010001 |
| 571 | −6.5 | −15.5 | 13 | 1111100011000 |
| 572 | −3.5 | 3 | 13 | 1111100011001 |
| 573 | −2 | −5 | 13 | 1111100011010 |
| 574 | −6 | −1.5 | 13 | 1111100011011 |
| 575 | 0 | −13 | 13 | 1111100101100 |
| 576 | 1.5 | −5.5 | 13 | 1111100101101 |
| 577 | −0.5 | 14 | 13 | 1111101110000 |
| 578 | −6.5 | −3.5 | 13 | 1111101110001 |
| 579 | −15.5 | −1 | 13 | 1111110011000 |
| 580 | −12.5 | −0.5 | 13 | 1111110011001 |
| 581 | 5 | 2 | 13 | 1111110110100 |
| 582 | 1.5 | 5.5 | 13 | 1111110110101 |
| 583 | 3 | 3.5 | 13 | 1111111000100 |
| 584 | 4 | 3 | 13 | 1111111000101 |
| 585 | 13 | −0.5 | 13 | 1111111000110 |
| 586 | −5 | 1.5 | 13 | 1111111000111 |
| 587 | −1 | −6.5 | 13 | 1111111001100 |
| 588 | 0 | 13 | 13 | 1111111001101 |
| 589 | 12.5 | −0.5 | 13 | 1111111101100 |
| 590 | 15 | −15.5 | 13 | 1111111101101 |
| 591 | −0.5 | −8 | 13 | 1111111101110 |
| 592 | −14.5 | −5.5 | 13 | 1111111101111 |
| 593 | 14.5 | −5.5 | 14 | 10010100001010 |
| 594 | −11.5 | 11.5 | 14 | 10010100001011 |
| 595 | 1.5 | 4 | 14 | 10010100001100 |
| 596 | 12.5 | 15.5 | 14 | 10010100001101 |
| 597 | 3.5 | −4 | 14 | 10010100011100 |
| 598 | 0 | 12 | 14 | 10010100011101 |
| 599 | −4 | −2.5 | 14 | 10010100101100 |
| 600 | −11.5 | −11.5 | 14 | 10010100101101 |
| 601 | 2 | −6 | 14 | 10010101100000 |
| 602 | −1.5 | 15.5 | 14 | 10010101100001 |
| 603 | −16 | −2 | 14 | 10010101100010 |
| 604 | 4.5 | −2.5 | 14 | 10010101100011 |
| 605 | −15.5 | 3.5 | 14 | 10010101101100 |
| 606 | −9.5 | −1 | 14 | 10010101101101 |
| 607 | −0.5 | 7 | 14 | 10010101110010 |
| 608 | −14.5 | 4.5 | 14 | 10010101110011 |
| 609 | 5 | −3 | 14 | 10010110110000 |
| 610 | −3.5 | −4.5 | 14 | 10010110110001 |
| 611 | 4 | −4 | 14 | 10010110110010 |
| 612 | 0.5 | −9 | 14 | 10010110110011 |
| 613 | −15 | −15 | 14 | 10100000100010 |
| 614 | 1 | 5.5 | 14 | 10100000100011 |
| 615 | −14.5 | −1 | 14 | 10100000100100 |
| 616 | −15 | −15.5 | 14 | 10100000100101 |

TABLE 2-continued

XY Joint VLC Motion Vector Table for General Video

| Index | Mv_x | Mv_y | Number of bits | Code |
|---|---|---|---|---|
| 617 | 5.5 | 3.5 | 14 | 10100000101100 |
| 618 | −5.5 | −14.5 | 14 | 10100000101101 |
| 619 | −1.5 | 5.5 | 14 | 10100000111000 |
| 620 | −11 | 0.5 | 14 | 10100000111001 |
| 621 | 0.5 | −13.5 | 14 | 10100000111010 |
| 622 | −12.5 | 0.5 | 14 | 10100000111011 |
| 623 | −0.5 | −14 | 14 | 10100000111100 |
| 624 | 15 | 0.5 | 14 | 10100000111101 |
| 625 | −6 | −3 | 14 | 10100001001110 |
| 626 | 4.5 | −2 | 14 | 10100001001111 |
| 627 | −4 | 2.5 | 14 | 10100001010010 |
| 628 | −14.5 | 5.5 | 14 | 10100001010011 |
| 629 | 14.5 | 4.5 | 14 | 10100001011000 |
| 630 | 5.5 | 1.5 | 14 | 10100001011001 |
| 631 | −15 | −5 | 14 | 10100010000000 |
| 632 | 0.5 | −10 | 14 | 10100010000001 |
| 633 | −2 | −6 | 14 | 10100010000010 |
| 634 | −1 | 9 | 14 | 10100010000011 |
| 635 | 13.5 | −15.5 | 14 | 10100010000100 |
| 636 | −9.5 | −9.5 | 14 | 10100010000101 |
| 637 | −15.5 | 8.5 | 14 | 10100010011010 |
| 638 | −14 | −1 | 14 | 10100010011011 |
| 639 | 10 | 0.5 | 14 | 10100010110100 |
| 640 | 2 | −5 | 14 | 10100010110101 |
| 641 | 15.5 | −6.5 | 14 | 10100010110110 |
| 642 | 2 | 4 | 14 | 10100010110111 |
| 643 | −1 | −12 | 14 | 10100011000000 |
| 644 | 0.5 | 7.5 | 14 | 10100011000001 |
| 645 | 0.5 | −16 | 14 | 10100011000010 |
| 646 | −14.5 | 10.5 | 14 | 10100011000011 |
| 647 | 6.5 | −3.5 | 14 | 10100011000110 |
| 648 | −1.5 | 5 | 14 | 10100011000111 |
| 649 | 1 | 6 | 14 | 10100011010100 |
| 650 | −0.5 | 15 | 14 | 10100011010101 |
| 651 | 6.5 | −1 | 14 | 10100011100110 |
| 652 | 11.5 | 11.5 | 14 | 10100011100111 |
| 653 | −14.5 | −15.5 | 14 | 10100011101100 |
| 654 | 9.5 | −9.5 | 14 | 10100011101101 |
| 655 | −2 | 3.5 | 14 | 10100011111010 |
| 656 | 15.5 | −14.5 | 14 | 10100011111011 |
| 657 | 0.5 | −15 | 14 | 10100011111100 |
| 658 | 0.5 | −8 | 14 | 10100011111101 |
| 659 | 14.5 | −15.5 | 14 | 10100011111110 |
| 660 | 6 | 3 | 14 | 10100011111111 |
| 661 | −6 | −2 | 14 | 10100100100000 |
| 662 | 11 | 0.5 | 14 | 10100100100001 |
| 663 | −4.5 | 2.5 | 14 | 10100100100010 |
| 664 | 0.5 | 8 | 14 | 10100100100011 |
| 665 | −5.5 | 3.5 | 14 | 10100101000100 |
| 666 | 11.5 | −11.5 | 14 | 10100101001000 |
| 667 | 13.5 | −14.5 | 14 | 10100101001000 |
| 668 | 6.5 | −15.5 | 14 | 10100101001001 |
| 669 | −14.5 | 9.5 | 14 | 10100101001010 |
| 670 | 6.5 | 3.5 | 14 | 10100101001011 |
| 671 | 15.5 | −11.5 | 14 | 10100101011010 |
| 672 | −5 | −4 | 14 | 10100101011011 |
| 673 | 5 | 1.5 | 14 | 10100101011100 |
| 674 | 3 | −5 | 14 | 10100101011101 |
| 675 | −1 | −15.5 | 14 | 10100101011110 |
| 676 | −9.5 | 3 | 14 | 10100101011111 |
| 677 | 4.5 | 2.5 | 14 | 10100101101000 |
| 678 | −6.5 | 2.5 | 14 | 10100101101001 |
| 679 | 1.5 | −5 | 14 | 10100110001110 |
| 680 | 15.5 | −4.5 | 14 | 10100110001111 |
| 681 | −15.5 | 14.5 | 14 | 10100110010100 |
| 682 | −3.5 | −4 | 14 | 10100110010101 |
| 683 | −15 | 1 | 14 | 10100110010110 |
| 684 | 2 | 5 | 14 | 10100110010111 |
| 685 | 3.5 | 8.5 | 14 | 10100110011000 |
| 686 | −5 | 3 | 14 | 10100110011001 |
| 687 | −11.5 | −3.5 | 14 | 10100110011100 |
| 688 | −9 | −3 | 14 | 10100110011101 |
| 689 | −6 | 2 | 14 | 10100110011110 |
| 690 | 1.5 | 6.5 | 14 | 10100110011111 |
| 691 | −14.5 | −10.5 | 14 | 10100110101110 |
| 692 | 5.5 | −3.5 | 14 | 10100110101111 |
| 693 | −12.5 | −15.5 | 14 | 10100110111000 |
| 694 | −4.5 | −3.5 | 14 | 10100110111001 |
| 695 | −4.5 | −2.5 | 14 | 10100110111010 |
| 696 | −9.5 | 3.5 | 14 | 10100110111011 |
| 697 | −14.5 | 15.5 | 14 | 10100110111100 |
| 698 | 9.5 | 8.5 | 14 | 10100110111101 |
| 699 | 6.5 | 2.5 | 14 | 10100111011000 |
| 700 | −1.5 | −6.5 | 14 | 10100111011001 |
| 701 | −10 | −3 | 14 | 10100111011010 |
| 702 | −11.5 | 3.5 | 14 | 10100111011011 |
| 703 | −2.5 | 3 | 14 | 10100111100100 |
| 704 | −2 | 5 | 14 | 10100111100101 |
| 705 | −5.5 | −3.5 | 14 | 10100111100110 |
| 706 | 9.5 | 3.5 | 14 | 10100111100111 |
| 707 | 1.5 | −15.5 | 14 | 10110000000010 |
| 708 | 6 | 1 | 14 | 10110000000011 |
| 709 | Esc | Esc | 4 | 1000 |

Brief Overview of a Computer System

Figure 7:
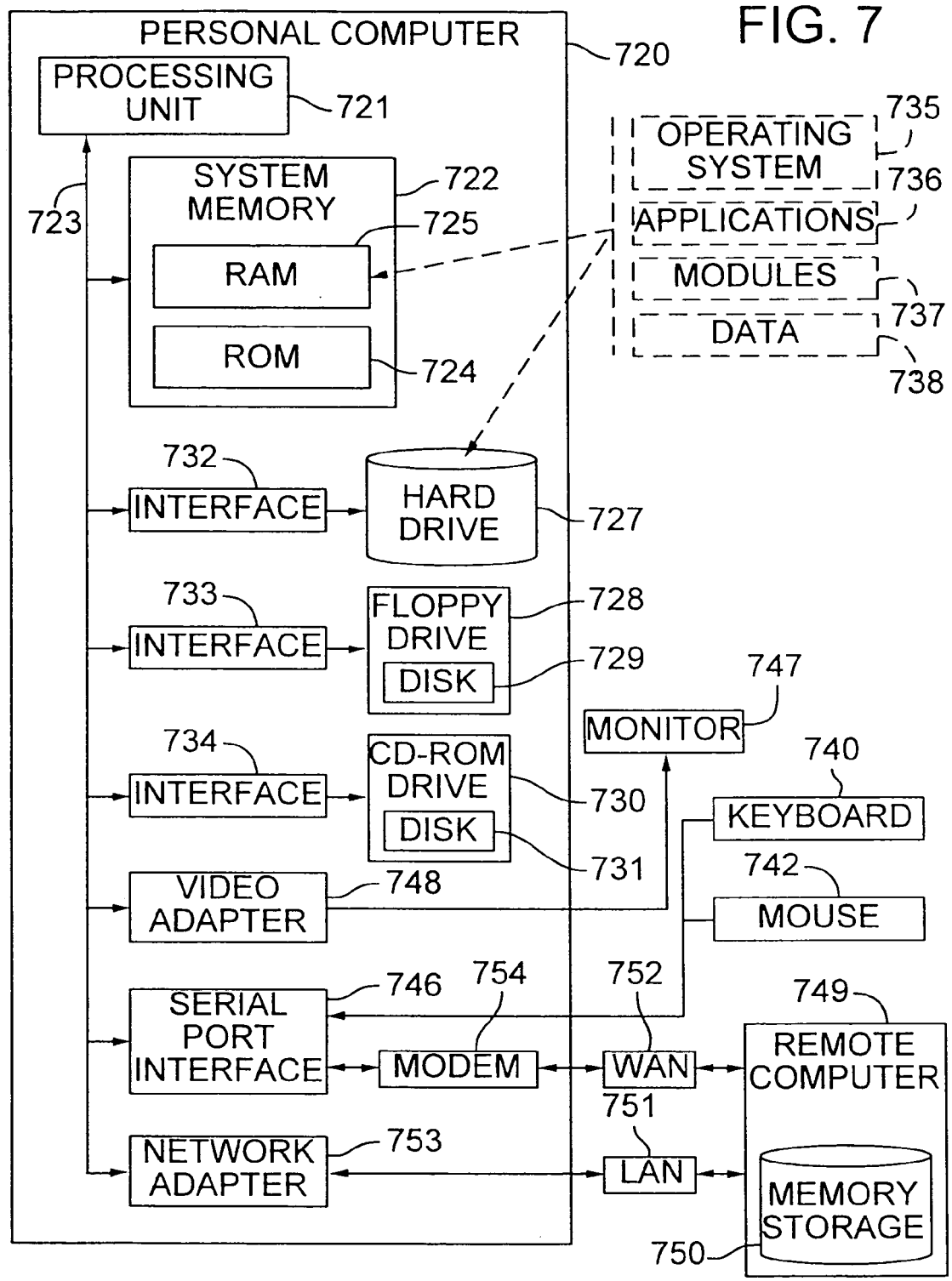
FIG. 7 is a diagram of a computer system that serves as an operating environment for a software implementation of the invention.

FIG. 7 and the following discussion are intended to provide a brief, general description of a suitable computing environment in which the invention may be implemented. Although the invention or aspects of it may be implemented in a hardware device, the encoder and decoder described above are implemented in computer-executable instructions organized in program modules. The program modules include the routines, programs, objects, components, and data structures that perform the tasks and implement the data types described above.

While FIG. 7 shows a typical configuration of a desktop computer, the invention may be implemented in other computer system configurations, including hand-held devices, multiprocessor systems, microprocessor-based or programmable consumer electronics, minicomputers, mainframe computers, and the like. The invention may also be used in distributed computing environments where tasks are performed by remote processing devices that are linked through a communications network. In a distributed computing environment, program modules may be located in both local and remote memory storage devices.

FIG. 7 illustrates an example of a computer system that serves as an operating environment for the invention. The computer system includes a personal computer 720, including a processing unit 721, a system memory 722, and a system bus 723 that interconnects various system components including the system memory to the processing unit 721. The system bus may comprise any of several types of bus structures including a memory bus or memory controller, a peripheral bus, and a local bus using a bus architecture such as PCI, VESA, Microchannel (MCA), ISA and EISA, to name a few. The system memory includes read only memory (ROM) 724 and random access memory (RAM) 725. A basic input/output system 726 (BIOS), containing the basic routines that help to transfer information between elements within the personal computer 720, such as during start-up, is stored in ROM 724. The personal computer 720 further includes a hard disk drive 727, a magnetic disk drive 728, e.g., to read from or write to a removable disk 729, and an optical disk drive 730, e.g., for reading a CD-ROM disk 731 or to read from or write to other optical media.

The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer-readable media provide nonvolatile storage of data, data structures, computer-executable instructions (program code such as dynamic link libraries, and executable files), etc. for the personal computer 720. Although the description of computer-readable media above refers to a hard disk, a removable magnetic disk and a CD, it can also include other types of media that are readable by a computer, such as magnetic cassettes, flash memory cards, digital video disks, Bernoulli cartridges, and the like.

A number of program modules may be stored in the drives and RAM 725, including an operating system 735, one or more application programs 736, other program modules 737, and program data 738. A user may enter commands and information into the personal computer 720 through a keyboard 740 and pointing device, such as a mouse 742. Other input devices (not shown) may include a microphone, joystick, game pad, satellite dish, scanner, or the like. These and other input devices are often connected to the processing unit 721 through a serial port interface 746 that is coupled to the system bus, but may be connected by other interfaces, such as a parallel port, game port or a universal serial bus (USB). A monitor 747 or other type of display device is also connected to the system bus 723 via an interface, such as a display controller or video adapter 748. In addition to the monitor, personal computers typically include other peripheral output devices (not shown), such as speakers and printers.

The personal computer 720 may operate in a networked environment using logical connections to one or more remote computers, such as a remote computer 749. The remote computer 749 may be a server, a router, a peer device or other common network node, and typically includes many or all of the elements described relative to the personal computer 720, although only a memory storage device 750 has been illustrated in FIG. 7. The logical connections depicted in FIG. 7 include a local area network (LAN) 751 and a wide area network (WAN) 752. Such networking environments are commonplace in offices, enterprise-wide computer networks, intranets and the Internet.

When used in a LAN networking environment, the personal computer 720 is connected to the local network 751 through a network interface or adapter 753. When used in a WAN networking environment, the personal computer 720 typically includes a modem 754 or other means for establishing communications over the wide area network 752, such as the Internet. The modem 754, which may be internal or external, is connected to the system bus 723 via the serial port interface 746. In a networked environment, program modules depicted relative to the personal computer 720, or portions thereof, may be stored in the remote memory storage device. The network connections shown are merely examples and other means of establishing a communications link between the computers may be used.

CONCLUSION

While the invention has been illustrated using a specific implementation as an example, the scope of the invention is not limited to the specific implementation described above. Spatial prediction effectively exploits the spatial dependency of motion vectors and improves the efficiency of jointly coding motion vectors with a single entropy code. However, the specific form of prediction used on the motion vectors is not critical to the invention. In fact, it is possible to implement the invention without using a prediction scheme.

The implementation described above specifically uses a Huffman coding scheme to compute entropy codes for a joint motion vector parameter. As noted, it is also possible to use other forms of entropy coding to encode the joint parameter with a single entropy code.

In view of the many possible implementations of the invention, it should be recognized that the implementation described above is only examples of the invention and should not be taken as a limitation on the scope of the invention. Rather, the scope of the invention is defined by the following claims. We therefore claim as our invention all that comes within the scope and spirit of these claims.

We claim:

1. A method comprising:
    selecting a variable length code table from among plural variable length code tables available in an encoder, wherein each of the plural available variable length code tables has a different set of plural variable length codes used for encoding and decoding motion vector differential information;
    computing a motion vector predictor for a motion vector, wherein the motion vector predictor includes a horizontal motion vector predictor component and a vertical motion vector predictor component, and wherein the motion vector includes a horizontal motion vector component and a vertical motion vector component;
    computing a horizontal motion vector differential component based at least in part upon difference between the horizontal motion vector component and the horizontal motion vector predictor component;
    computing a vertical motion vector differential component based at least in part upon difference between the vertical motion vector component and the vertical motion vector predictor component; and
    using the selected variable length code table, producing a first variable length code from the set of plural variable length codes of the selected variable length code table, wherein the first variable length code jointly represents information used for decoding the horizontal motion vector differential component and for decoding the vertical motion vector differential component.

2. The method of claim 1 wherein the motion vector is for a current block or macroblock of a video picture, and wherein the computing the motion vector predictor depends at least in part on location of the current block or macroblock in the video picture.

3. The method of claim 1 wherein the horizontal motion vector predictor component is the median of three neighbor horizontal motion vector components, and wherein the vertical motion vector predictor component is the median of three neighbor vertical motion vector components.

4. The method of claim 1 wherein a first neighbor to the left of a current macroblock, a second neighbor above the current macroblock, and a third neighbor above and diagonally adjacent to the current macroblock with a position to the left or right depending on spatial location of the current macroblock, each have one of three neighbor horizontal motion vector components and one of three neighbor vertical motion vector components.

5. The method of claim 1 further comprising:
    producing first additional information used for decoding the horizontal motion vector differential component; and
    producing second additional information used for decoding the vertical motion vector differential component.

6. The method of claim 5 wherein the first variable length code indicates the presence of the first and second additional information, and wherein the first variable length code, the first additional information, and the second additional information collectively have variable length from motion vector to motion vector.

7. The method of claim 1 wherein the first variable length code indicates the absence of first additional information used for decoding the horizontal motion vector differential component and second additional information used for decoding the vertical motion vector differential component.

8. The method of claim 1 wherein the motion vector is for a block.

9. The method of claim 1 wherein the motion vector is for a macroblock.

10. The method of claim 1 wherein the selected variable length code table is adapted for a particular target bit rate and/or a particular kind of content.

11. A method comprising:
for each macroblock of plural macroblocks of a video picture,
receiving a variable length code that jointly represents information used for reconstructing a horizontal motion vector differential component for a motion vector of the macroblock and a vertical motion vector differential component for the motion vector of the macroblock; and
reconstructing the horizontal motion vector differential component and the vertical motion vector differential component based at least in part on the variable length code, including looking up the variable length code in one of plural variable length code tables available at a decoder for motion vector differential information, wherein each of the plural variable length code tables has a different set of plural variable length code.

12. The method of claim 11 further comprising:
for each macroblock of the plural macroblocks of the video picture;
computing a motion vector predictor for the motion vector for the macroblock, wherein the motion vector predictor includes a horizontal motion vector predictor component and a vertical motion vector predictor component, and wherein the motion vector includes a horizontal motion vector component and a vertical motion vector component; and
reconstructing the motion vector for the macroblock, including combining the horizontal motion vector differential component with the horizontal motion vector predictor component and combining the vertical motion vector differential component with the vertical motion vector predictor component.

13. The method of claim 12 wherein the computing the motion vector predictor depends at least in part on location of the macroblock in the video picture.

14. The method of claim 12 wherein the horizontal motion vector predictor component is the median of three neighbor horizontal motion vector components, and wherein the vertical motion vector predictor component is the median of three neighbor vertical motion vector components.

15. The method of claim 12 wherein a first neighbor to the left of a current macroblock, a second neighbor above the current macroblock, and a third neighbor above and diagonally adjacent to the current macroblock with a position to the left or right depending on spatial location of the current macroblock, each have one of three neighbor horizontal motion vector components and one of three neighbor vertical motion vector components.

16. The method of claim 11 wherein the video picture is a video frame.

17. The method of claim 11 further comprising receiving first and second additional information after the variable length code, wherein the reconstructing the horizontal motion vector differential component is further based at least in part on the first additional information, wherein the reconstructing the vertical motion vector differential component is further based at least in part on the second additional information, and wherein the variable length code and the first and second additional information collectively have variable length from motion vector to motion vector.

18. The method of claim 17 wherein the variable length code indicates the presence of the first and second additional information.

19. The method of claim 11 wherein the variable length code indicates the absence of first additional information for the horizontal motion vector differential component and second additional information for the vertical motion vector differential component.

20. The method of claim 11 wherein the selected variable length code table is adapted for a particular target bit rate and/or a particular kind of content.

21. A computer-readable medium storing computer-executable instructions for causing a computer system programmed thereby to perform the method of claim 11.

22. A method comprising:
for each block of plural blocks of a video picture,
receiving a variable length code that jointly represents information used for reconstructing a horizontal motion vector differential component for a motion vector for the block and a vertical motion vector differential component for the motion vector for the block; and
reconstructing the horizontal motion vector differential component and the vertical motion vector differential component based at least in part on the variable length code, including looking up the variable length code in one of plural variable length code tables available at a decoder for motion vector differential information, wherein each of the plural variable length code tables has a differential set of plural variable length codes.

23. The method of claim 22 wherein the video picture is a video frame.

24. The method of claim 22 further comprising receiving first and second additional information after the variable length code, wherein the reconstructing the horizontal motion vector differential component is further based at least in part on the first additional information, and wherein the reconstructing the vertical motion vector differential component is further based at least in part on the second additional information.

25. The method of claim 24 wherein the variable length code indicates the presence of the first and second additional information, and wherein the variable length code and the first and second additional information collectively have variable length from motion vector to motion vector.

26. The method of claim 22 wherein the variable length code indicates the absence of first additional information for the horizontal motion vector differential component and second additional information for the vertical motion vector differential component.

27. The method of claim 22 wherein the selected variable length code table is adapted for a particular target bit rate and/or a particular kind of content.

28. A computer-readable medium storing computer-executable instructions for causing a computer system programmed thereby to perform the method of claim 22.

29. A method comprising:
- receiving a variable length code that jointly represents information used for reconstructing a horizontal motion vector differential component for a motion vector and for reconstructing a vertical motion vector differential component for the motion vector;
- decoding the variable length code with one of plural alternative variable length code tables available at a decoder for motion vector differential information, wherein each of the plural alternative variable length code tables uses a different set of plural variable length codes;
- receiving first additional information;
- reconstructing the horizontal motion vector differential component based at least in part on the first additional information;
- receiving second additional information; and
- reconstructing the vertical motion vector differential component based at least in part on the second additional information.

30. The method of claim 29 further comprising
- computing a motion vector predictor for the motion vector, wherein the motion vector predictor includes a horizontal motion vector predictor component and a vertical motion vector predictor component, and wherein the motion vector includes a horizontal motion vector component and a vertical motion vector component; and
- reconstructing the motion vector, including combining the horizontal motion vector differential component with the horizontal motion vector predictor component and combining the vertical motion vector differential component with the vertical motion vector predictor component.

31. The method of claim 30 wherein the motion vector is for a current block or macroblock of a video picture, and wherein the computing the motion vector predictor depends at least in part on location of the current block or macroblock in the video picture.

32. The method of claim 30 wherein the horizontal motion vector predictor component is the median of plural neighbor horizontal motion vector components, and wherein the vertical motion vector predictor component is the median of plural neighbor vertical motion vector components.

33. The method of claim 29 wherein the variable length code indicates the presence of the first and second additional information.

34. The method of claim 33 wherein the variable length code and the first and second additional information collectively have variable length from motion vector to motion vector.

35. The method of claim 29 wherein the motion vector is for a block.

36. The method of claim 29 wherein the motion vector is for a macroblock.

37. The method of claim 29 wherein the selected variable length code table is adapted for a particular target bit rate and/or a particular kind of content.

38. A computer-readable medium storing computer-executable instructions for causing a computer system programmed thereby to perform the method of claim 29.

39. The method of claim 1 wherein the different sets of plural variable length codes for the plural variable length code tables differ in which variable length codes are in the tables but have the same motion vector range and motion vector accuracy.

40. The method of claim 1 wherein the plural variable length code tables include a first table and a second table, wherein the first table has a first variable length code not in the second table, wherein the second table has a second variable length code not in the first table, and wherein the first table has a third variable length code also in the second table.

41. The method of claim 11 wherein the different sets of plural variable length codes for the plural variable length code tables differ in which variable length codes are in the tables but have the same motion vector range and motion vector accuracy.

42. The method of claim 11 wherein the plural variable length code tables include a first table and a second table, wherein the first table has a first variable length code not in the second table, wherein the second table has a second variable length code not in the first table, and wherein the first table has a third variable length code also in the second table.

* * * * *